(12) United States Patent
Degges, Jr. et al.

(10) Patent No.: US 11,994,676 B2
(45) Date of Patent: *May 28, 2024

(54) METHOD AND SYSTEM FOR RESOLVING HEMISPHERE AMBIGUITY IN SIX DEGREE OF FREEDOM POSE MEASUREMENTS

(71) Applicant: Magic Leap, Inc., Plantation, FL (US)

(72) Inventors: Ronald Joseph Degges, Jr., Fairfield, CA (US); Sheng Wan, San Jose, CA (US); Andy Warner, Plantation, FL (US); Akash Gujarati, Plantation, FL (US)

(73) Assignee: Magic Leap, Inc., Plantation, FL (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/684,228

(22) Filed: Mar. 1, 2022

(65) Prior Publication Data

US 2023/0021404 A1 Jan. 26, 2023

Related U.S. Application Data

(63) Continuation of application No. 16/752,165, filed on Jan. 24, 2020, now Pat. No. 11,300,783.

(Continued)

(51) Int. Cl.
*G02B 27/00* (2006.01)
*G01P 15/08* (2006.01)
*G02B 27/01* (2006.01)

(52) U.S. Cl.
CPC ...... *G02B 27/0093* (2013.01); *G01P 15/0888* (2013.01); *G02B 27/0172* (2013.01); *G02B 2027/0138* (2013.01); *G02B 2027/014* (2013.01)

(58) Field of Classification Search
CPC ............ G02B 27/0093; G02B 27/0172; G02B 2027/0138; G02B 2027/014; G01P 15/0888
See application file for complete search history.

(56) References Cited

U.S. PATENT DOCUMENTS 10,268,668 B1 * 4/2019 West ..................... G06F 40/186
10,539,644 B1 * 1/2020 Alarcon Herrera .... A61B 5/062
(Continued)

FOREIGN PATENT DOCUMENTS

JP 2003240532 A 8/2003
JP 2013527915 A 7/2013
(Continued)

OTHER PUBLICATIONS

Wu, H., Zhao, Y., & Zhang, C. (Sep. 2018). Efficient Hemisphere Unambiguous Magnetic Positioning for Helmet Mounted Sights. In 2018 IEEE/AIAA 37th Digital Avionics Systems Conference (DASC) (pp. 1-6). IEEE.*

(Continued)

*Primary Examiner* — Sarah Lhymn
(74) *Attorney, Agent, or Firm* — KILPATRICK TOWNSEND & STOCKTON LLP

(57) ABSTRACT

Techniques for resolving hemisphere ambiguity are disclosed. One or more magnetic fields are emitted at a handheld controller. The one or more magnetic fields are detected by one or more sensors positioned relative to a headset. Movement data corresponding to the handheld controller or the headset is detected. During a first time interval, a first position and a first orientation of the handheld controller within a first hemisphere are determined based on the detected one or more magnetic fields, and a first discrepancy is calculated based on the first position, the first orientation, and the movement data. During a second time interval, a second position and a second orientation of the handheld (Continued)

controller within a second hemisphere are determined based on the detected one or more magnetic fields, and a second discrepancy is calculated based on the second position, the second orientation, and the movement data.

17 Claims, 13 Drawing Sheets

Related U.S. Application Data

(60) Provisional application No. 62/797,776, filed on Jan. 28, 2019.

(56) References Cited

U.S. PATENT DOCUMENTS

| | | | |
|---|---|---|---|
| 11,300,783 | B2 | 4/2022 | Degges, Jr. et al. |
| 2004/0040805 | A1 | 3/2004 | Bailey |
| 2005/0062469 | A1 | 3/2005 | Anderson |
| 2014/0051983 | A1 | 2/2014 | Schroeder et al. |
| 2015/0077326 | A1* | 3/2015 | Kramer .............. G06F 3/0346 345/156 |
| 2015/0373321 | A1 | 12/2015 | Bridges |
| 2016/0113730 | A1 | 4/2016 | Lightcap et al. |
| 2016/0154241 | A1* | 6/2016 | Alhashim .............. A63F 13/24 345/8 |
| 2016/0259404 | A1* | 9/2016 | Woods ................ G01S 19/42 |
| 2016/0377688 | A1 | 12/2016 | Kleiner et al. |
| 2017/0206691 | A1 | 7/2017 | Harrises et al. |
| 2017/0238996 | A1* | 8/2017 | Frame ................. A61B 34/20 |
| 2017/0307891 | A1* | 10/2017 | Bucknor ............... G01S 1/68 |
| 2018/0302486 | A1* | 10/2018 | Ma ..................... H04L 67/1004 |
| 2018/0329644 | A1* | 11/2018 | Das ..................... G06F 3/0604 |
| 2019/0012806 | A1* | 1/2019 | Lehmann .............. G06T 7/75 |
| 2019/0113325 | A1* | 4/2019 | Chung ................ G01C 21/165 |
| 2019/0243472 | A1* | 8/2019 | Stafford .............. A63F 13/216 |
| 2020/0241292 | A1 | 7/2020 | Degges, Jr. et al. |

FOREIGN PATENT DOCUMENTS

| | | |
|---|---|---|
| WO | 2014125809 A1 | 8/2014 |
| WO | 2016141373 A1 | 9/2016 |
| WO | 2017189450 A1 | 11/2017 |

OTHER PUBLICATIONS

U.S. Appl. No. 16/752,165, "Notice of Allowance", dated Aug. 31, 2021, 11 pages.
U.S. Appl. No. 16/752,165, "Notice of Allowance", dated Jan. 5, 2022, 11 pages.
Abrudan et al., "Distortion Rejecting Magneto-Inductive Three-Dimensional Localization (MagLoc)", IEEE Journal on Selected Areas in Communications, vol. 33, No. 11, Nov. 1, 2015, pp. 2404-2417.
Delorme, "Method for the Characterisation and Feasibility Study of A Six Degree-of-Freedom Electromagnetic Tracking System", Dec. 9, 2015, 24 pages.
Application No. EP20748083.1, "Extended European Search Report", dated Feb. 14, 2022, 11 pages.
Gefen et al., "Applying Functional Near Infrared (fNIR) Spectroscopy To Enhance MIS Research", Transactions on Human-Computer Interaction, vol. 6, No. 3, Sep. 2014, pp. 55-73.
Livingston, "Magnetic Tracker Calibration for Improved Augmented Reality Registration", Presence: Teleoperators & Virtual Environments, vol. 6, Issue 5, 1997, pp. 532-546.
Application No. PCT/US2020/015029, "International Preliminary Report on Patentability", dated Aug. 12, 2021, 10 pages.
Application No. PCT/US2020/01502, "International Search Report and Written Opinion", dated Apr. 20, 2020, 11 pages.
EP20748083.1, "Office Action", Mar. 20, 2024, 6 pages.
JP2021-543158, "Office Action" and English translation, Feb. 29, 2024, 5 pages.

* cited by examiner

METHOD AND SYSTEM FOR RESOLVING HEMISPHERE AMBIGUITY IN SIX DEGREE OF FREEDOM POSE MEASUREMENTS

CROSS-REFERENCES TO RELATED APPLICATIONS

This application is a continuation of U.S. patent application Ser. No. 16/752,165, filed on Jan. 24, 2020, U.S. Pat. No. 11,300,783, issued on Apr. 12, 2022, entitled "METHOD AND SYSTEM FOR RESOLVING HEMISPHERE AMBIGUITY IN SIX DEGREE OF FREEDOM POSE MEASUREMENTS," which is a non-provisional of and claims the benefit of and priority to U.S. Provisional Patent Application No. 62/797,776, filed Jan. 28, 2019, entitled "METHOD AND SYSTEM FOR RESOLVING HEMISPHERE AMBIGUITY IN SIX DEGREE OF FREEDOM POSE MEASUREMENTS," which are hereby incorporated by reference in their entirety for all purposes.

BACKGROUND

Modern computing and display technologies have facilitated the development of systems for so called "virtual reality" or "augmented reality" experiences, wherein digitally reproduced images or portions thereof are presented to a user in a manner wherein they seem to be, or may be perceived as, real. A virtual reality, or "VR," scenario typically involves presentation of digital or virtual image information without transparency to other actual real-world visual input; an augmented reality, or "AR," scenario typically involves presentation of digital or virtual image information as an augmentation to visualization of the actual world around the user.

Despite the progress made in these display technologies, there is a need in the art for improved methods, systems, and devices related to augmented reality systems, particularly, display systems.

SUMMARY

The present disclosure relates generally to techniques for improving the performance and user experience of optical systems. More particularly, embodiments of the present disclosure provide methods for operating an augmented reality (AR) or virtual reality (VR) device in which a handheld controller is employed for assisting operation of the device. A summary of the present disclosure is described in reference to the examples given below. As used below, any reference to a series of examples is to be understood as a reference to each of those examples disjunctively (e.g., "Examples 1-4" is to be understood as "Examples 1, 2, 3, or 4").

Example 1 is a method of resolving hemisphere ambiguity at a system comprising one or more sensors, the method comprising: emitting, at a handheld controller, one or more magnetic fields; detecting, by one or more sensors positioned within a headset or a belt pack of the system, the one or more magnetic fields; running a first processing stack during a first time interval, wherein running the first processing stack includes: determining a first position and a first orientation of the handheld controller within a first hemisphere with respect to the headset based on the one or more magnetic fields; and calculating a first discrepancy based on the first position, the first orientation, and movement data corresponding to either the handheld controller or the headset; running a second processing stack during a second time interval, wherein running the second processing stack includes: determining a second position and a second orientation of the handheld controller within a second hemisphere with respect to the headset based on the one or more magnetic fields, wherein the second hemisphere is diametrically opposite the first hemisphere; and calculating a second discrepancy based on the second position, the second orientation, and the movement data; and aborting either the first processing stack or the second processing stack based on one or both of the first discrepancy and the second discrepancy.

Example 2 is the method of example(s) 1, further comprising: detecting the movement data by an inertial measurement unit (IMU) positioned within the handheld controller.

Example 3 is the method of example(s) 1, further comprising: detecting the movement data by an inertial measurement unit (IMU) positioned within the headset.

Example 4 is the method of example(s)s 2 or 3, wherein the movement data is detected during one or both of the first time interval and the second time interval.

Example 5 is the method of example(s)s 2 or 3, wherein the movement data is detected prior to both the first time interval and the second time interval.

Example 6 is the method of example(s) 1, wherein the first time interval is concurrent with the second time interval.

Example 7 is the method of example(s) 1, wherein the first time interval is simultaneous with the second time interval.

Example 8 is the method of example(s) 1, wherein the first time interval has a first start time and the second time interval has a second start time, and wherein the first start time and the second start time are simultaneous or are separated by less than a threshold.

Example 9 is the method of example(s) 1, further comprising: comparing the first discrepancy to a threshold; determining that the first discrepancy exceeds the threshold; and in response to determining that the first discrepancy exceeds the threshold: aborting the first processing stack; and allowing the second processing stack to continue.

Example 10 is the method of example(s) 1, further comprising: comparing the second discrepancy to a threshold; determining that the second discrepancy exceeds the threshold; and in response to determining that the second discrepancy exceeds the threshold: aborting the second processing stack; and allowing the first processing stack to continue.

Example 11 is the method of example(s) 1, further comprising: comparing the first discrepancy to the second discrepancy; determining that the first discrepancy exceeds the second discrepancy; and in response to determining that the first discrepancy exceeds the second discrepancy: aborting the first processing stack; and allowing the second processing stack to continue.

Example 12 is the method of example(s) 1, further comprising: comparing the first discrepancy to the second discrepancy; determining that the second discrepancy exceeds the first discrepancy; and in response to determining that the second discrepancy exceeds the first discrepancy: aborting the second processing stack; and allowing the first processing stack to continue.

Example 13 is the method of example(s) 1, wherein the first hemisphere is a front hemisphere with respect to the headset and the second hemisphere is a back hemisphere with respect to the headset.

Example 14 is the method of example(s) 1, further comprising: delivering virtual content to the user based on either: the first position and the first orientation; or the second position and the second orientation.

Example 15 is the method of example(s) 1, wherein the system is an optical device.

Example 16 is a system comprising: a handheld controller comprising a magnetic field emitter configured to emit one or more magnetic fields; a headset or belt pack comprising one or more magnetic field sensors configured to detect the one or more magnetic fields; a processor configured to perform operations including: running a first processing stack during a first time interval, wherein running the first processing stack includes: determining a first position and a first orientation of the handheld controller within a first hemisphere with respect to the headset based on the one or more magnetic fields; and calculating a first discrepancy based on the first position, the first orientation, and movement data corresponding to either the handheld controller or the headset; running a second processing stack during a second time interval, wherein running the second processing stack includes: determining a second position and a second orientation of the handheld controller within a second hemisphere with respect to the headset based on the one or more magnetic fields, wherein the second hemisphere is diametrically opposite the first hemisphere; and calculating a second discrepancy based on the second position, the second orientation, and the movement data; and aborting either the first processing stack or the second processing stack based on one or both of the first discrepancy and the second discrepancy.

Example 17 is the system of example(s) 16, further comprising: detecting the movement data by an inertial measurement unit (IMU) positioned within the handheld controller.

Example 18 is the system of example(s) 16, wherein the operations further comprise: detecting the movement data by an inertial measurement unit (IMU) positioned within the headset.

Example 19 is the system of example(s)s 17 or 18, wherein the movement data is detected during one or both of the first time interval and the second time interval.

Example 20 is the system of example(s)s 17 or 18, wherein the movement data is detected prior to both the first time interval and the second time interval.

Example 21 is the system of example(s) 16, wherein the first time interval is concurrent with the second time interval.

Example 22 is the system of example(s) 16, wherein the first time interval is simultaneous with the second time interval.

Example 23 is the system of example(s) 16, wherein the first time interval has a first start time and the second time interval has a second start time, and wherein the first start time and the second start time are simultaneous or are separated by less than a threshold.

Example 24 is the system of example(s) 16, wherein the operations further comprise: comparing the first discrepancy to a threshold; determining that the first discrepancy exceeds the threshold; and in response to determining that the first discrepancy exceeds the threshold: aborting the first processing stack; and allowing the second processing stack to continue.

Example 25 is the system of example(s) 16, wherein the operations further comprise: comparing the second discrepancy to a threshold; determining that the second discrepancy exceeds the threshold; and in response to determining that the second discrepancy exceeds the threshold: aborting the second processing stack; and allowing the first processing stack to continue.

Example 26 is the system of example(s) 16, wherein the operations further comprise: comparing the first discrepancy to the second discrepancy; determining that the first discrepancy exceeds the second discrepancy; and in response to determining that the first discrepancy exceeds the second discrepancy: aborting the first processing stack; and allowing the second processing stack to continue.

Example 27 is the system of example(s) 16, wherein the operations further comprise: comparing the first discrepancy to the second discrepancy; determining that the second discrepancy exceeds the first discrepancy; and in response to determining that the second discrepancy exceeds the first discrepancy: aborting the second processing stack; and allowing the first processing stack to continue.

Example 28 is the system of example(s) 16, wherein the first hemisphere is a front hemisphere with respect to the headset and the second hemisphere is a back hemisphere with respect to the headset.

Example 29 is the system of example(s) 16, wherein the operations further comprise: delivering virtual content to the user based on either: the first position and the first orientation; or the second position and the second orientation.

Example 30 is the system of example(s) 16, wherein the system is an optical device.

Example 31 is a method of resolving hemisphere ambiguity, the method comprising: emitting one or more magnetic fields at a handheld controller; detecting the one or more magnetic fields by one or more sensors positioned relative to a headset; detecting movement data corresponding to the handheld controller or the headset; during a first time interval: determining a first position and a first orientation of the handheld controller within a first hemisphere with respect to the headset based on the detected one or more magnetic fields; and calculating a first discrepancy based on the first position, the first orientation, and the movement data; during a second time interval: determining a second position and a second orientation of the handheld controller within a second hemisphere with respect to the headset based on the detected one or more magnetic fields, wherein the second hemisphere is diametrically opposite the first hemisphere; and calculating a second discrepancy based on the second position, the second orientation, and the movement data.

Example 32 is a system comprising: a handheld controller comprising a magnetic field emitter configured to emit one or more magnetic fields; a headset comprising one or more magnetic field sensors configured to detect the one or more magnetic fields; a movement sensor configured to detect movement data corresponding to the handheld controller or the headset; and one or more processors configured to perform operations including: during a first time interval: determining a first position and a first orientation of the handheld controller within a first hemisphere with respect to the headset based on the detected one or more magnetic fields; and calculating a first discrepancy based on the first position, the first orientation, and the movement data; during a second time interval: determining a second position and a second orientation of the handheld controller within a second hemisphere with respect to the headset based on the detected one or more magnetic fields, wherein the second hemisphere is diametrically opposite the first hemisphere; and calculating a second discrepancy based on the second position, the second orientation, and the movement data.

Example 33 is a non-transitory computer-readable medium comprising instructions that, when executed by one or more processors, cause the one or more processors to perform operations comprising: emitting one or more magnetic fields at a handheld controller; detecting the one or more magnetic fields by one or more sensors positioned relative to a headset; detecting movement data corresponding to the handheld controller or the headset; during a first time interval: determining a first position and a first orientation of the handheld controller within a first hemisphere with respect to the headset based on the detected one or more magnetic fields; and calculating a first discrepancy based on the first position, the first orientation, and the movement data; during a second time interval: determining a second position and a second orientation of the handheld controller within a second hemisphere with respect to the headset based on the detected one or more magnetic fields, wherein the second hemisphere is diametrically opposite the first hemisphere; and calculating a second discrepancy based on the second position, the second orientation, and the movement data.

BRIEF DESCRIPTION OF THE DRAWINGS

The accompanying drawings, which are included to provide a further understanding of the disclosure, are incorporated in and constitute a part of this specification, illustrate embodiments of the disclosure and together with the detailed description serve to explain the principles of the disclosure. No attempt is made to show structural details of the disclosure in more detail than may be necessary for a fundamental understanding of the disclosure and various ways in which it may be practiced.

DETAILED DESCRIPTION OF SPECIFIC EMBODIMENTS

Figure 1:
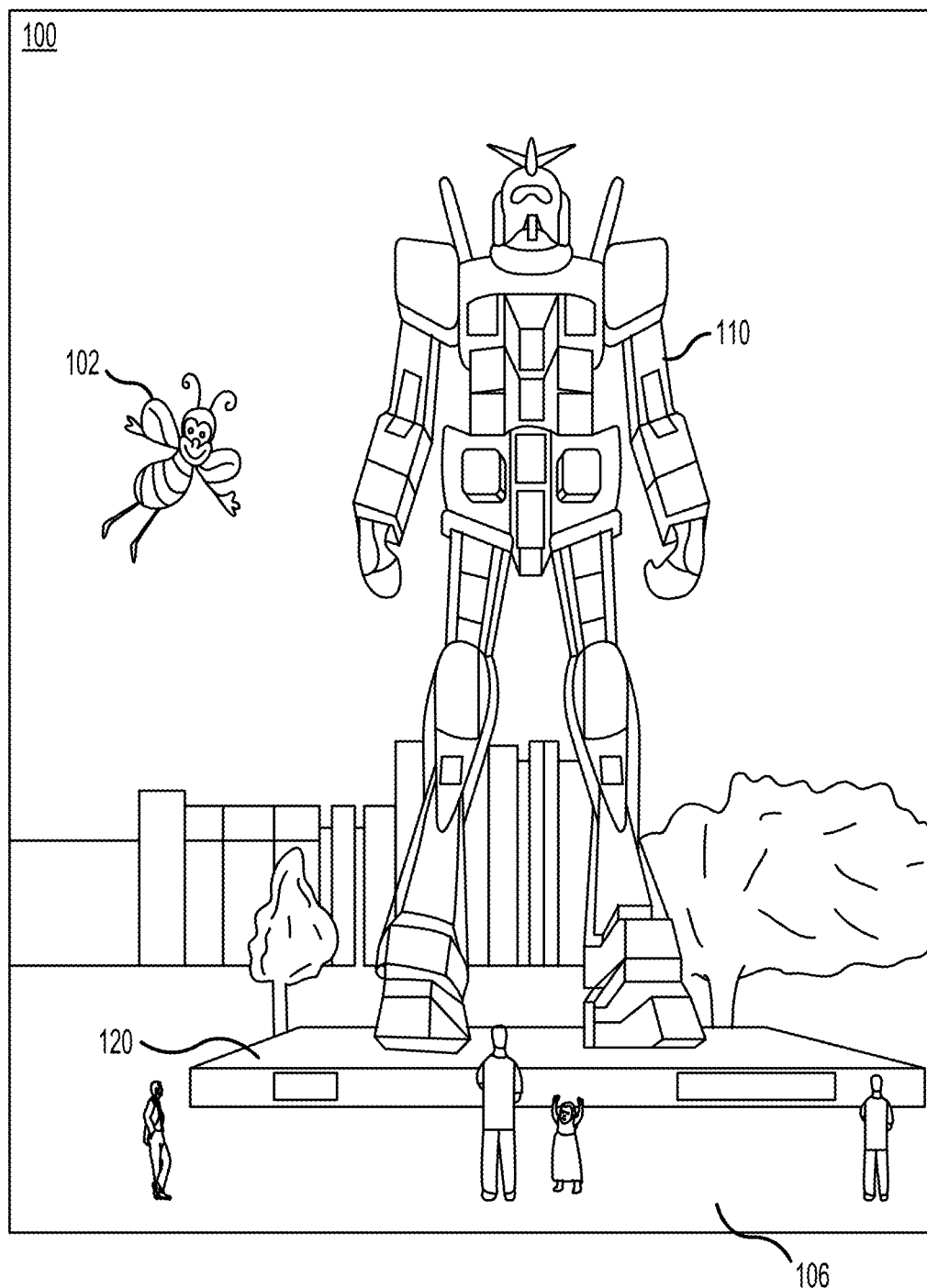
FIG. 1 illustrates an augmented reality (AR) scene as viewed through a wearable AR device, according to some embodiments.

A typical head-worn augmented reality (AR) display is at least loosely coupled to a user's head, and thus moves when the user's head moves. If the user's head motions are detected by the display system, the data being displayed can be updated to take the change in head pose into account. As an example, if a user wearing a head-worn display views a virtual representation of a three-dimensional (3D) object on the display and walks around the area where the 3D object appears, that 3D object can be re-rendered for each viewpoint, giving the user the perception that they are walking around an object that occupies real space. If the head-worn display is used to present multiple objects within a virtual space (for instance, a rich virtual world), measurements of head pose (e.g., the location and orientation of the user's head) can be used to re-render the scene to match the user's dynamically changing head location and orientation and provide an increased sense of immersion in the virtual space.

Accordingly, detection or calculation of head pose can facilitate the display system to render virtual objects such that they appear to occupy a space in the real world in a manner that makes sense to the user. In addition, detection of the position and/or orientation of a real object, such as a handheld device or controller (which also may be referred to as a "totem"), haptic device, or other real physical object, in relation to the user's head or AR system may also facilitate the display system in presenting display information to the user to enable the user to interact with certain aspects of the AR system efficiently. At least for AR applications, placement of virtual objects in spatial relation to physical objects (e.g., presented to appear spatially proximate a physical object in two- or three-dimensions) may be a non-trivial problem.

For example, head movement may significantly complicate placement of virtual objects in a view of an ambient environment. Such is true whether the view is captured as an image of the ambient environment and then projected or displayed to the end user, or whether the end user perceives the view of the ambient environment directly. For instance, head movement will likely cause a field of view of the end user to change, which will likely require an update to where various virtual objects are displayed in the field of the view of the end user.

Additionally, head movements may occur within a large variety of ranges and speeds. Head movement speed may vary not only between different head movements, but within or across the range of a single head movement. For instance, head movement speed may initially increase (e.g., linearly or not) from a starting point, and may decrease as an ending point is reached, obtaining a maximum speed somewhere between the starting and ending points of the head movement. Rapid head movements may even exceed the ability of the particular display or projection technology to render images that appear uniform and/or as smooth motion to the end user.

Head tracking accuracy and latency (i.e., the elapsed time between when the user moves his or her head and the time when the image gets updated and displayed to the user) have been challenges for virtual reality (VR) and AR systems. Especially for display systems that fill a substantial portion of the user's visual field with virtual elements, it can be important that the accuracy of head-tracking is high and that the overall system latency is very low from the first detection of head motion to the updating of the light that is delivered by the display to the user's visual system. If the latency is high, the system can create a mismatch between the user's vestibular and visual sensory systems, and generate a user perception scenario that can lead to motion sickness or simulator sickness. If the system latency is high, the apparent location of virtual objects will appear unstable during rapid head motions.

In addition to head-worn display systems, other display systems can benefit from accurate and low latency head pose detection. These include head-tracked display systems in which the display is not worn on the user's body, but is, e.g., mounted on a wall or other surface. The head-tracked display acts like a window onto a scene, and as a user moves his head relative to the "window" the scene is re-rendered to match the user's changing viewpoint. Other systems include a head-worn projection system, in which a head-worn display projects light onto the real world.

Additionally, in order to provide a realistic augmented reality experience, AR systems may be designed to be interactive with the user. For example, multiple users may play a ball game with a virtual ball and/or other virtual objects. One user may "catch" the virtual ball, and throw the ball back to another user. In another embodiment, a first user may be provided with a totem (e.g., a real bat communicatively coupled to the AR system) to hit the virtual ball. In other embodiments, a virtual user interface may be presented to the AR user to allow the user to select one of many options. The user may use totems, haptic devices, wearable components, or simply touch the virtual screen to interact with the system.

Detecting head pose and orientation of the user, and detecting a physical location of real objects in space enable the AR system to display virtual content in an effective and enjoyable manner. However, although these capabilities are key to an AR system, they are difficult to achieve. For example, the AR system may need to recognize a physical location of a real object (e.g., user's head, totem, haptic device, wearable component, user's hand, etc.) and correlate the physical coordinates of the real object to virtual coordinates corresponding to one or more virtual objects being displayed to the user. This can require highly accurate sensors and sensor recognition systems that track a position and orientation of one or more objects at rapid rates.

Current approaches do not perform localization at satisfactory speed or precision standards. Thus, there is a need for better localization systems in the context of AR and VR devices. In the following description, various embodiments will be described. For purposes of explanation, specific configurations and details are set forth in order to provide a thorough understanding of the embodiments. However, it will also be apparent to one skilled in the art that the embodiments may be practiced without the specific details. Furthermore, well-known features may be omitted or simplified in order not to obscure the embodiments being described.

FIG. 1 illustrates an AR scene as viewed through a wearable AR device according to some embodiments described herein. An AR scene 100 is depicted wherein a user of an AR technology sees a real-world park-like setting 106 featuring people, trees, buildings in the background, and a concrete platform 120. In addition to these items, the user of the AR technology also perceives that he "sees" a robot statue 110 standing upon the real-world platform 120, and a cartoon-like avatar character 102 flying by, which seems to be a personification of a bumble bee, even though these elements (character 102 and statue 110) do not exist in the real world. Due to the extreme complexity of the human visual perception and nervous system, it is challenging to produce a VR or AR technology that facilitates a comfortable, natural-feeling, rich presentation of virtual image elements amongst other virtual or real-world imagery elements.

Figure 2:
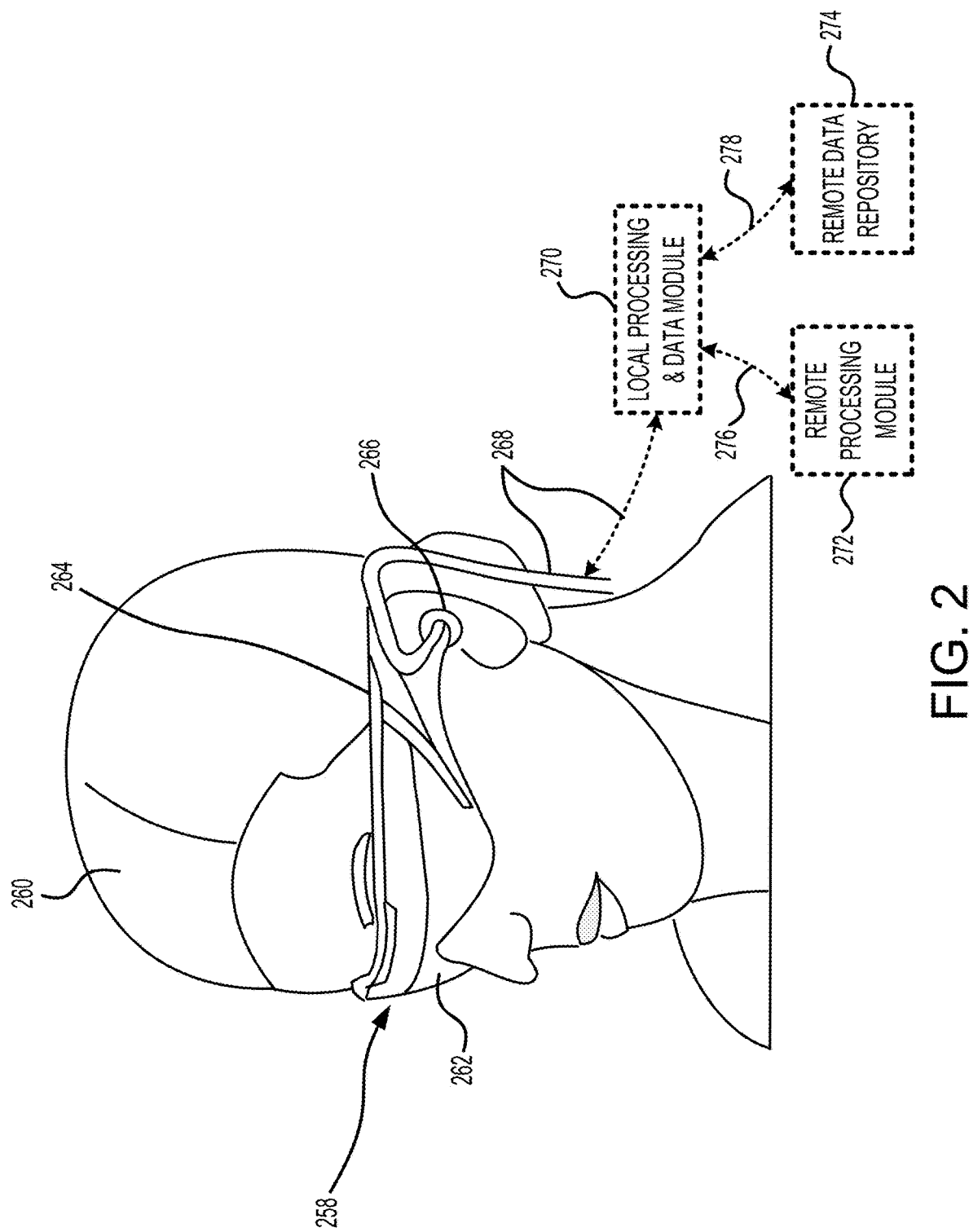
FIG. 2 illustrates various possible components of an AR system.

FIG. 2 illustrates various possible components of an AR system. In the illustrated embodiment, an AR system user 260 is depicted wearing a head mounted component 258 featuring a frame 264 structure coupled to a display system 262 positioned in front of the eyes of the user. A speaker 266 is coupled to frame 264 in the depicted configuration and is positioned adjacent the ear canal of the user (in one embodiment, another speaker, not shown, is positioned adjacent the other ear canal of the user to provide for stereo/shapeable sound control). Display 262 is operatively coupled (as indicated by 268), such as by a wired lead or wireless connectivity, to a local processing and data module 270 which may be mounted in a variety of configurations, such as fixedly attached to frame 264, fixedly attached to a helmet or hat, removably attached to the torso of user 260 in a backpack-style configuration, or removably attached to the hip of user 260 in a belt-coupling style configuration.

Local processing and data module 270 may include a power-efficient processor or controller, as well as digital memory, such as flash memory, both of which may be utilized to assist in the processing, caching, and storage of data that is (1) captured from sensors which may be operatively coupled to frame 264, such as image capture devices (such as cameras), microphones, inertial measurement units, accelerometers, compasses, GPS units, radio devices, and/or gyroscopes; and/or is (2) acquired and/or processed using remote processing module 272 and/or remote data repository 274, possibly for passage to display 262 after such processing or retrieval.

Local processing and data module 270 may be operatively coupled (as indicated by 276, 278), such as via one or more wired or wireless communication links, to remote processing module 272 and remote data repository 274 such that these remote modules 272, 274 are operatively coupled to each other and available as resources to local processing and data module 270. In one embodiment, remote processing module 272 may include one or more relatively powerful processors or controllers configured to analyze and process data and/or image information. In one embodiment, remote data repository 274 may include a relatively large-scale digital data storage facility, which may be available through the internet or other networking configuration in a "cloud" resource configuration. In one embodiment, all data is stored and all computation is performed in the local processing and data module, allowing fully autonomous use from any remote modules.

One approach to achieve high precision localization may involve the use of an electromagnetic field coupled with electromagnetic sensors that are strategically placed on the user's AR headset, belt pack, and/or other ancillary devices (e.g., totems, haptic devices, gaming instruments, etc.). Electromagnetic tracking systems typically include at least an electromagnetic field emitter and at least one electromagnetic field sensor. The sensors may measure electromagnetic fields with a known distribution. Based on these measurements a position and orientation of a field sensor relative to the emitter is determined.

Figure 3:
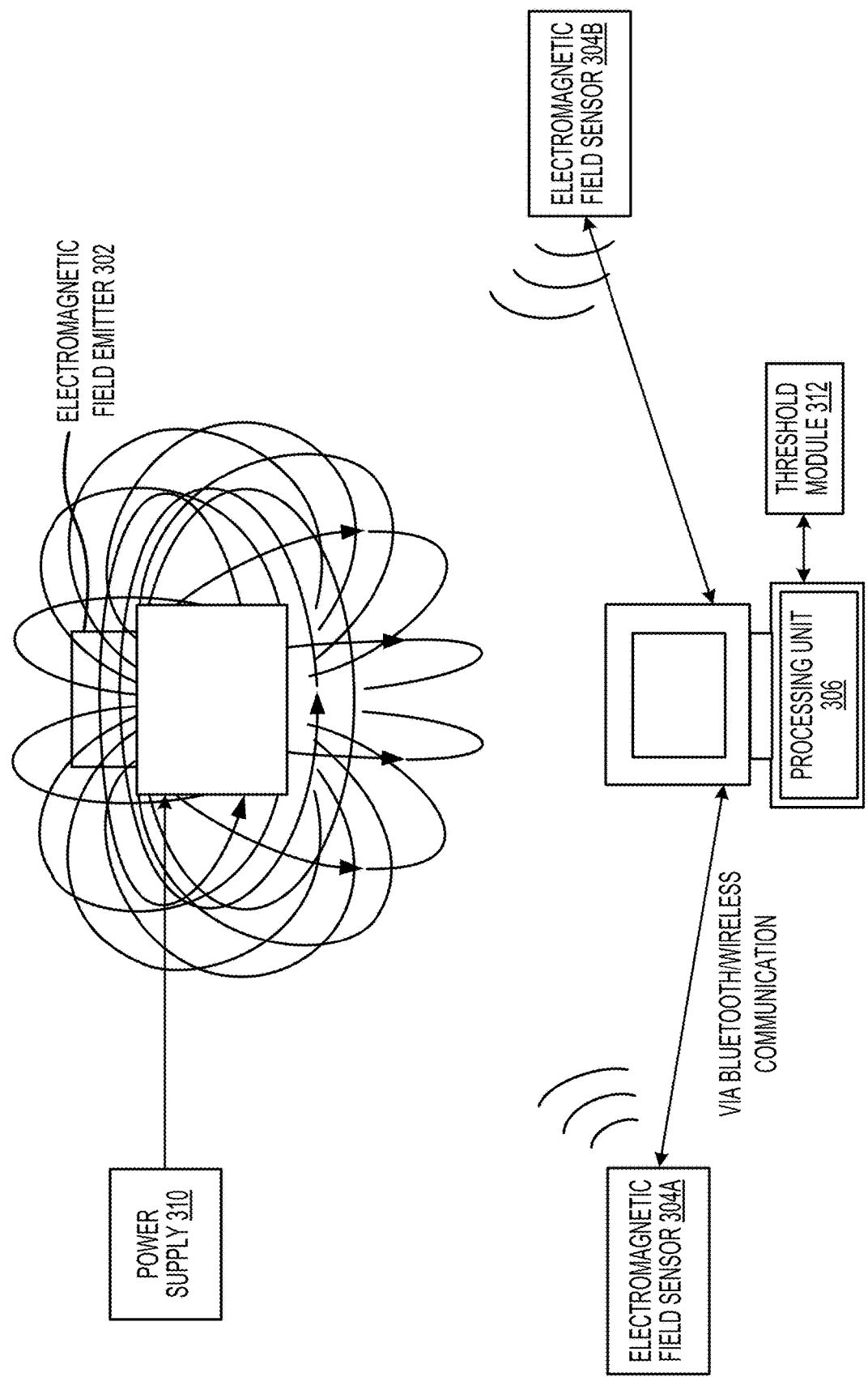
FIG. 3 illustrates an example system diagram of an electromagnetic tracking system.

FIG. 3 illustrates an example system diagram of an electromagnetic tracking system, which may have similar components to those developed by organizations such as the Biosense (RTM) division of Johnson & Johnson Corporation, Polhemus (RTM), Inc. of Colchester, Vermont, manufactured by Sixense (RTM) Entertainment, Inc. of Los Gatos, California, and other tracking companies. In one or more embodiments, the electromagnetic tracking system includes an electromagnetic field emitter 302 which is configured to emit a known magnetic field. As shown in FIG.

3, electromagnetic field emitter 302 may be coupled to a power supply 310 (e.g., electric current, batteries, etc.) to provide power to electromagnetic field emitter 302.

In one or more embodiments, electromagnetic field emitter 302 includes several coils (e.g., at least three coils positioned perpendicular to each other to produce fields in the X, Y, and Z directions) that generate magnetic fields. These magnetic fields are used to establish a coordinate space, which allows the system to map a position of the sensors in relation to the known magnetic field, and helps determine a position and/or orientation of the sensors. In one or more embodiments, electromagnetic sensors 304A, 304B, etc. may be attached to one or more real objects. Electromagnetic sensors 304 may include smaller coils in which current may be induced through the emitted electromagnetic field.

Generally the components of electromagnetic field sensors 304 may include small coils or loops, such as a set of three differently oriented (i.e., such as orthogonally oriented relative to each other) coils coupled together within a small structure such as a cube or other container, that are positioned/oriented to capture incoming magnetic flux from the magnetic field emitted by electromagnetic field emitter 302, and by comparing currents induced through these coils, and knowing the relative positioning and orientation of the coils relative to each other, the relative position and orientation of a sensor relative to the emitter may be calculated.

Figure 4:
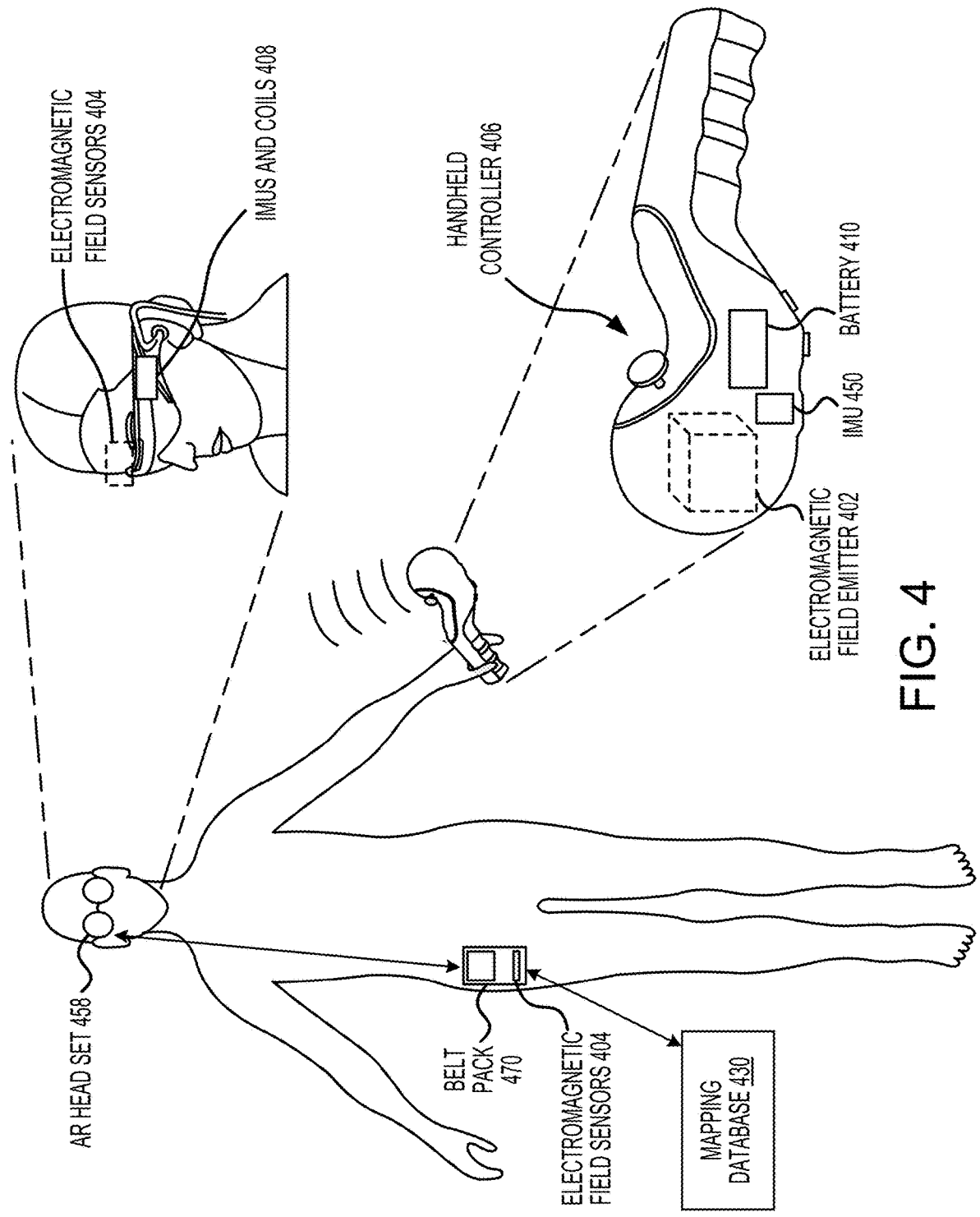
FIG. 4 illustrates an example of how an electromagnetic tracking system may be incorporated with an AR system.

As will be further described in reference to FIG. 4, one or more movement sensors such as inertial measurement units (IMUs) may be operatively coupled to each of electromagnetic field emitter 302 and electromagnetic field sensors 304 to detect the position and orientation of each component relative to each other and/or relative to a coordinate system. In one or more embodiments, multiple sensors (possibly including IMUs) may be used in relation to electromagnetic field emitter 302 and electromagnetic field sensors 304 to detect the position and orientation of each component. In some instances, the electromagnetic tracking system may provide positions in three directions (i.e., X, Y and Z directions), and further in two or three orientation angles. In some embodiments, measurements of the IMU(s) may be compared to the measurements of the coil to determine a position and orientation of the sensors. In one or more embodiments, both electromagnetic (EM) data and movement data, along with various other sources of data, such as cameras, depth sensors, and other sensors, may be combined to determine the position and orientation. This information may be transmitted (e.g., wireless communication, Bluetooth, etc.) to a processing unit 306. In some embodiments, pose (or position and orientation) may be reported at a relatively high refresh rate in conventional systems.

Conventionally an electromagnetic emitter is coupled to a relatively stable and large object, such as a table, operating table, wall, or ceiling, and one or more sensors are coupled to smaller objects, such as medical devices, handheld gaming components, or the like. Alternatively, as described below in reference to FIG. 4, various features of the electromagnetic tracking system may be employed to produce a configuration wherein changes or deltas in position and/or orientation between two objects that move in space relative to a more stable global coordinate system may be tracked; in other words, a configuration is shown in FIG. 4 wherein a variation of an electromagnetic tracking system may be utilized to track position and orientation delta between a head-mounted component and a handheld component, while head pose relative to the global coordinate system (say of the room environment local to the user) is determined otherwise, such as by simultaneous localization and mapping (SLAM) techniques using outward-capturing cameras which may be coupled to the head mounted component of the system.

Processing unit 306 may control electromagnetic field emitter 302, and may also capture data from the various electromagnetic field sensors 304. It should be appreciated that the various components of the system may be coupled to each other through any electro-mechanical or wireless/Bluetooth means. Processing unit 306 may also include data regarding the known magnetic field, and the coordinate space in relation to the magnetic field. This information is then used to detect the position and orientation of the sensors in relation to the coordinate space corresponding to the known electromagnetic field. Processing unit 306 may further be coupled to a threshold module 312 (as shown in the illustrated embodiment) or may, alternatively or additionally, include threshold module 312 as a subcomponent. In some implementations, threshold module 312 may be configured to dynamically adjust a threshold against which discrepancy values calculated by processing unit 306 may be compared for determining the pose of the handheld controller, as will be described in greater detail below.

One advantage of electromagnetic tracking systems is that they produce highly accurate tracking results with minimal latency and high resolution. Additionally, the electromagnetic tracking system does not necessarily rely on optical trackers, and sensors/objects not in the user's line of-vision may be easily tracked. It should be appreciated that the strength of the electromagnetic field v drops as a cubic function of distance r from a coil transmitter (e.g., electromagnetic field emitter 302). Thus, processing unit 306 may be configured to execute certain functions, such as algorithms predicting a distance based on a measured strength, to determine a position and orientation of the sensor/object at varying distances away from electromagnetic field emitter 302.

Given the rapid decline of the strength of the electromagnetic field as one moves farther away from the electromagnetic emitter, best results, in terms of accuracy, efficiency and low latency, may be achieved at closer distances. In typical electromagnetic tracking systems, the electromagnetic field emitter is powered by electric current (e.g., plug-in power supply) and has sensors located within 20 ft radius away from the electromagnetic field emitter. A shorter radius between the sensors and field emitter may be more desirable in many applications, including AR applications.

FIG. 4 illustrates an example of how an electromagnetic tracking system may be incorporated with an AR system, with an electromagnetic field emitter 402 incorporated as part of a handheld controller 406. In one or more embodiments, the handheld controller may be a totem to be used in a gaming scenario. In other embodiments, the handheld controller may be a haptic device. In yet other embodiments, the electromagnetic field emitter may simply be incorporated as part of a belt pack 470. Handheld controller 406 may include a battery 410 or other power supply that powers electromagnetic field emitter 402. It should be appreciated that electromagnetic field emitter 402 may also include or be coupled to an IMU 450 or other movement sensor configured to assist in determining positioning and/or orientation of electromagnetic field emitter 402 relative to other components. This may be especially important in cases where both field emitter 402 and sensors 404 are mobile. Placing electromagnetic field emitter 402 in the handheld controller rather than the belt pack, as shown in the embodiment of FIG. 4, ensures that the electromagnetic field emitter is not competing for resources at the belt pack, but rather uses its own battery source at handheld controller 406.

In some embodiments, electromagnetic sensors 404 may be positioned relative to AR head set 458, such as placed on one or more locations on AR head set 458 and/or on one or more locations on belt pack 470. Sensors placed on AR head set 458 may be placed along with other sensing devices such as one or more IMUs or additional magnetic flux capturing coils 408. For example, as shown in FIG. 4, sensors 404, 408 may be placed on either side of headset 458. Since these sensors are engineered to be rather small (and hence may be less sensitive, in some cases), having multiple sensors may improve efficiency and precision. In one or more embodiments, one or more sensors may also be placed on the belt pack 470 or any other part of the user's body. Sensors 404, 408 may communicate wirelessly or through Bluetooth to a computing apparatus that determines a pose and orientation of the sensors (and the AR headset to which it is attached). In one or more embodiments, the computing apparatus may reside at belt pack 470. In other embodiments, the computing apparatus may reside at the headset itself, or even handheld controller 406. The computing apparatus may in turn include a mapping database 430 (e.g., passable world model, coordinate space, etc.) to detect pose, to determine the coordinates of real objects and virtual objects, and may even connect to cloud resources and the passable world model, in one or more embodiments.

In many instances, conventional electromagnetic emitters may be too bulky for AR devices. Therefore the electromagnetic field emitter may be engineered to be compact, using smaller coils compared to traditional systems. However, given that the strength of the electromagnetic field decreases as a cubic function of the distance away from the field emitter, a shorter radius between electromagnetic sensors 404 and electromagnetic field emitter 402 (e.g., about 3-3.5 ft) may reduce power consumption when compared to conventional systems. This aspect may either be utilized to prolong the life of battery 410 that may power handheld controller 406 and the electromagnetic field emitter 402, in one or more embodiments. Or, in other embodiments, this aspect may be utilized to reduce the size of the coils generating the magnetic field at electromagnetic field emitter 402. However, in order to get the same strength of magnetic field, the power may need to be increased. This allows for a compact electromagnetic field emitter unit 402 that may fit compactly at handheld controller 406.

Several other changes may be made when using the electromagnetic tracking system for AR devices, which may require a more efficient pose reporting rate than other applications. For example, movement-based or IMU-based pose tracking may be employed. In many cases, increased stability of the IMUs can lead to increased efficiency of the pose detection process. The IMUs may be engineered such that they remain stable up to 50-100 milliseconds. It should be appreciated that some embodiments may utilize an outside pose estimator module (i.e., IMUs may drift over time) that may enable pose updates to be reported at a rate of 10-20 Hz. By keeping the IMUs stable at a reasonable rate, the rate of pose updates may be decreased to 10-20 Hz (as compared to higher frequencies in conventional systems).

If the electromagnetic tracking system can be run at a 10% duty cycle (e.g., only pinging for ground truth every 100 milliseconds), this would be an additional way to save power at the AR system. This would mean that the electromagnetic tracking system wakes up every 10 milliseconds out of every 100 milliseconds to generate a pose estimate. This directly translates to power consumption savings, which may, in turn, affect size, battery life and cost of the AR device. In one or more embodiments, this reduction in duty cycle may be strategically utilized by providing two handheld controllers (not shown) rather than just one. For example, the user may be playing a game that requires two totems, etc. Or, in a multi-user game, two users may have their own totems/handheld controllers to play the game. When two controllers (e.g., symmetrical controllers for each hand) are used rather than one, the controllers may operate at offset duty cycles. The same concept may also be applied to controllers utilized by two different users playing a multiplayer game, for example.

Figure 5:
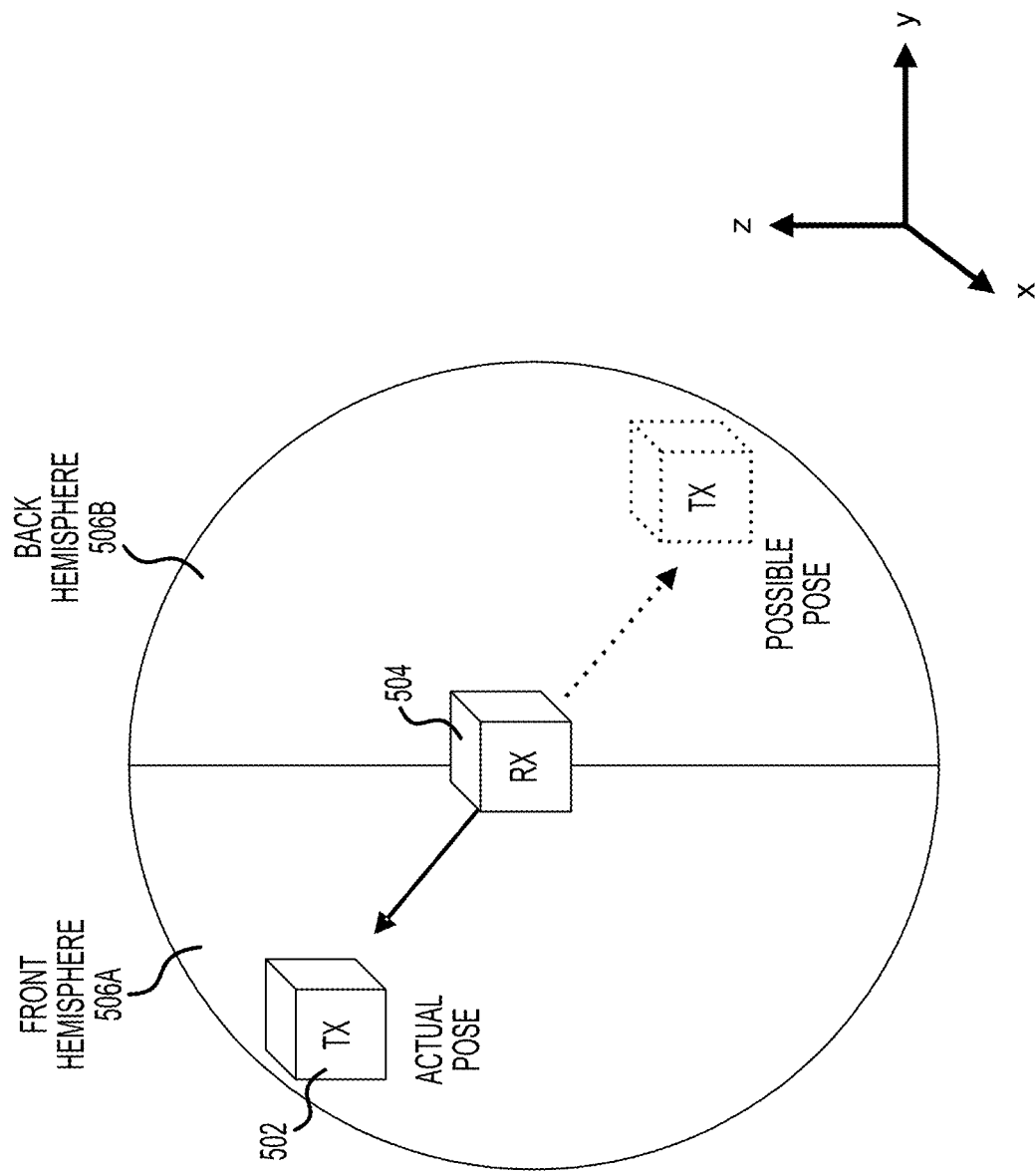
FIG. 5 illustrates the hemisphere ambiguity problem that may be present in electromagnetic tracking systems.

FIG. 5 illustrates the hemisphere ambiguity problem that may be present in electromagnetic tracking systems such as those described herein. For six degree of freedom (DOF) tracking, a handheld controller 502 (labeled "TX"), which may also be referred to as a handheld device or totem, may generate EM signals modulated on three separate frequencies, one for each axis X, Y, and Z. A wearable 504 (labeled "RX"), which may be implemented as an AR headset, has an EM receiving component that is receiving EM signals on the X, Y, and Z frequencies. The position and orientation (i.e., pose) of the handheld controller can be derived based on the characteristics of the received EM signals. However, due to the symmetric nature of the EM signals, it may not be possible to determine which hemisphere the handheld controller is in (e.g., front hemisphere 506A or back hemisphere 506B) without an additional reference frame. That is, the same EM values can be obtained at the wearable for two diametrically opposed totem poses (one in each hemisphere), with a chosen plane passing through the center of a sphere dividing the two hemispheres. This is illustrated in FIG. 5, which shows that for a single snapshot of received EM signals by wearable 504, either pose can be valid. However, when handheld controller 502 is moved, the tracking algorithm will typically encounter errors if the wrong hemisphere is chosen due to inconsistency in the data from the various sensors. The hemisphere ambiguity arises in part due to the fact that when a six DOF tracking session is started, the initial EM totem data does not have an unequivocal absolute position. Instead, it provides a relative distance, which can be interpreted as one of two positions in the 3D volume that is divided into two equal spheres with the wearable (e.g., the AR headset mounted on the head of the user) centered between the two hemispheres. Thus, embodiments of the present disclosure provide methods and systems that resolve hemisphere ambiguity in order to enable successful tracking of the actual position of the handheld controller.

According to some embodiments of the present disclosure, a method that can be used to solve to the hemisphere ambiguity problem includes starting two processing stacks when the tracking pipeline is started: one associated with a reference pose in the front hemisphere and the other associated with a reference pose in the back hemisphere. While both processing stacks are running, their output is checked—the processing stack with the wrong assumption of hemisphere will quickly have problems tracking the handheld controller's actual motion. At that point, the erroneous processing stack can be stopped (e.g., destroyed or terminated) and the remaining instance is allowed to continue processing. In some embodiments, a check is periodically performed to calculate a divergence between an estimated pose (a fusion of the electromagnetic data and positional data as determined by a movement sensor such as an IMU) and each reference pose (e.g., the reference pose in hemisphere 506A and the reference pose in hemisphere 506B). If either calculated divergence exceeds a threshold, then the corresponding instance of the tracking module for the particular estimated pose is stopped. Additional description related to these methods is provided more fully with respect to the description provided below.

Figure 6:
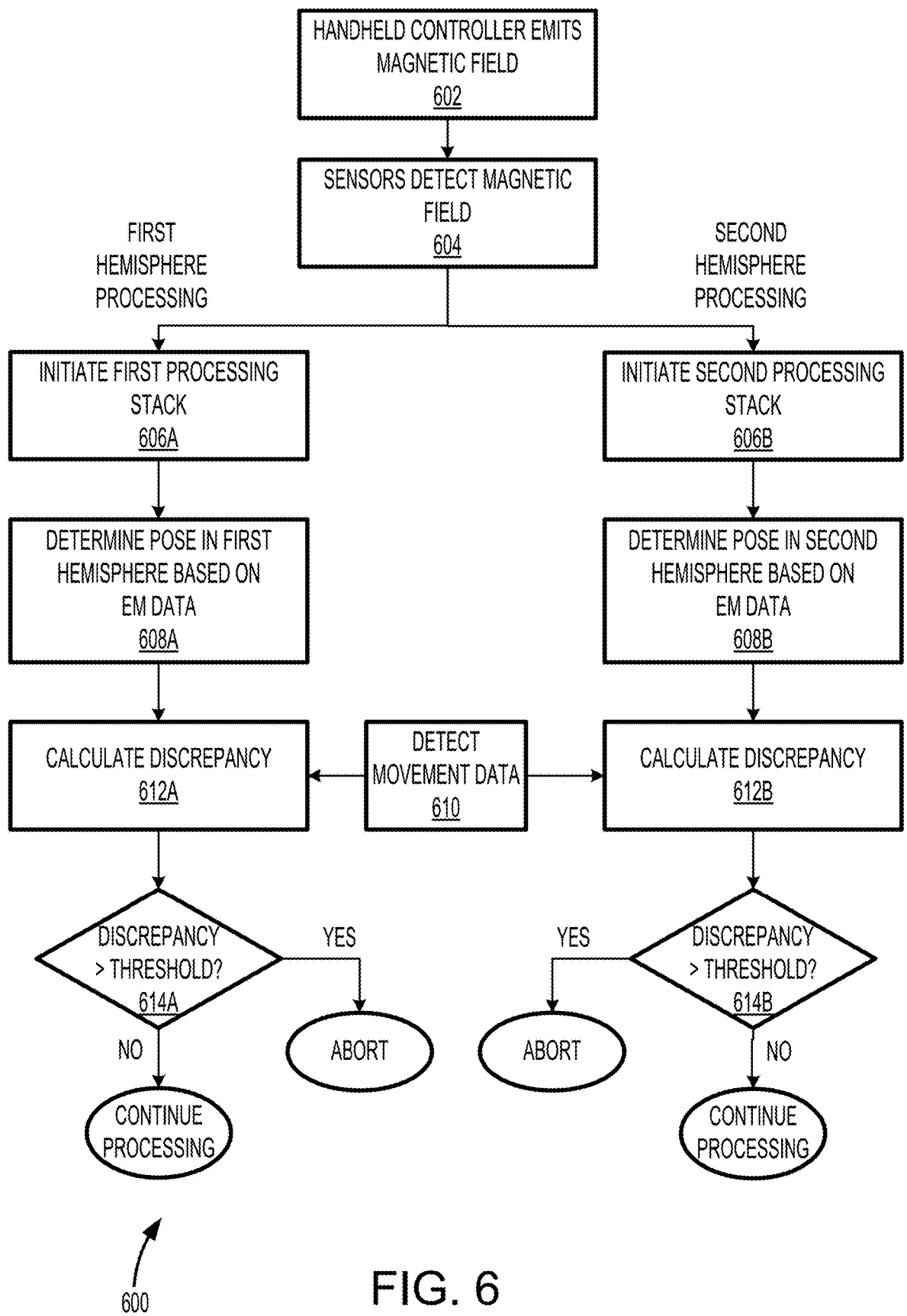
FIG. 6 illustrates a method for resolving hemisphere ambiguity at a system or device including one or more sensors.

FIG. 6 illustrates a method 600 for resolving hemisphere ambiguity at a system or device including one or more sensors. The system may be an electromagnetic tracking system or an optical device, such as an AR device, or any system supporting the emission and reception of electromagnetic signals or magnetic signals, among other possibilities. One or more steps of method 600 may be omitted during performance of method 600, and steps need not be performed in the order shown. One or more steps of method 600 may be performed by processing unit 306, local processing and data module 270, and/or remote processing module 272, among other possibilities.

At step 602, one or more magnetic fields may be emitted by a magnetic field emitter positioned at the handheld controller. The magnetic field emitter may generate magnetic fields by each coil generating a magnetic field in one direction (e.g., X, Y, or Z). The magnetic fields may be generated with an arbitrary waveform. In one or more embodiments, each of the axes may oscillate at a slightly different frequency. Although magnetic fields are discussed in some embodiments, this discussion of magnetic fields is not intended to limit embodiments of the present disclosure and other fields, including electric fields and electromagnetic fields are included within the scope of the present disclosure.

At step 604, the one or more magnetic fields may be detected by one or more sensors positioned within the headset or the belt pack. In some embodiments, a coordinate space corresponding to the magnetic or electromagnetic field may be determined. For example, the coordinate space around the emitter (e.g., the handheld controller) may be determined based on the detected magnetic field. In some embodiments, the behavior of the coils at the sensors (which may be attached to a known object) may be detected. For example, a current induced at the coils may be calculated. In other embodiments, a rotation of coils, or any other quantifiable behavior may be tracked and measured.

At step 606A, a first processing stack is initiated causing the first processing stack to run during a first time interval. Running the first processing stack may include performing one or more of steps 608A, 612A, and 614A. The first processing stack may run on local processing and data module 270, remote processing module 272, or on a server remote to the device. At step 606B, a second processing stack is initiated causing the second processing stack to run during a second time interval. Running the second processing stack may include performing one or more of steps 608B, 612B, and 614B. The second processing stack may run on local processing and data module 270, remote processing module 272, or on a server remote to the device. The first time interval may be simultaneous, concurrent, or nonconcurrent (i.e., non-overlapping) with the second time interval. In some embodiments, the first processing stack and the second processing stack are initialized simultaneously. In some embodiments, the first processing stack and the second processing stack are initialized sequentially.

At step 608A, the position and orientation of the handheld controller within a first hemisphere is determined based on the detected magnetic fields. At step 608B, the position and orientation of the handheld controller within a second hemisphere is determined based on the detected magnetic fields. The first hemisphere and the second hemisphere may be diametrically opposite and, in some embodiments, may correspond to the front hemisphere and the back hemisphere with respect to the headset. However, the first hemisphere and the second hemisphere may be defined in any of a variety of configurations, including front/back, above/below, left/right. In some embodiments, the interface between the hemispheres is defined by the plane having a normal that is pointing 10, 20, 30, 40, 50, 60, 70, or 80 degrees downward from a forward direction of the headset. In one example, controller 406 may consult a mapping table that correlates a behavior of the coils at the sensors to various positions or orientations. Based on these calculations, the position in the coordinate space along with the orientation of the sensors may be determined.

At step 610, movement data is detected by a movement sensor, such as an IMU sensor. The movement data may correspond to (e.g., may be indicative of) movement of the handheld controller and/or the headset. The movement data may include linear acceleration, angular rate, and/or orientation data, among other possibilities. In some embodiments, the movement data may be referred to as IMU data when detected by an IMU sensor. In some instances, the IMU sensor may be positioned within the handheld controller or the headset. For example, the IMU sensor may be mounted within the handheld controller or the headset. In some embodiments, the movement data is detected by two different IMUs, one within the handheld controller and another within the headset. In such embodiments, the movement data may be used to determine relative movement of the handheld controller with respect to the headset.

At steps 612A, 612B, one or more performance statistics associated with the first processing stack and the second processing stack are analyzed, respectively. In the illustrated embodiment, a discrepancy is calculated between the determined positions and orientations from steps 608A, 608B and a relative movement of the handheld controller with respect to the headset as determined using the movement data. In some examples, for each processing stack, multiple poses may be determined and compared to the movement of the handheld controller as indicated by the movement data. If, for example, the movement data indicates that the handheld controller is not moving (with respect to the headset) while the determined pose(s) (determined using the detected magnetic data) indicate that the handheld controller is moving, a discrepancy with a high value may be calculated.

At steps 614A, 614B, the discrepancies calculated in steps 612A, 612B, are compared to a predetermined threshold. If either discrepancy exceeds the threshold, the corresponding processing stack is aborted or terminated and the other processing stack is allowed to continue processing (e.g., continue determinations of the pose of the handheld controller in the respective hemisphere based on additional detected magnetic fields). In some embodiments, the threshold acts as an acceptable accuracy threshold such that if either discrepancy is less than the threshold, the corresponding processing stack is allowed to continue processing and the other processing stack is aborted. In some alternative embodiments, if the discrepancy is greater than the threshold, but lower than a second threshold, indicating a discrepancy of relatively small value, which can be referred to as an intermediate discrepancy, portions of the process may be repeated. For example, if this intermediate discrepancy is calculated at 612A, portions 608A, 610, 612A, and 614A may be repeated until the discrepancy exceeds the second threshold, which will result in termination of the first hemisphere processing. In some embodiments, the threshold value is dynamic, as opposed to a fixed value, and may permit a larger or smaller discrepancy depending on the estimated pose over time. Non limiting examples of dynamic thresholds include determining large changes in an estimated pose over a short time and then controller 306 (or intermediate decision block) may temporarily permit a threshold with a larger discrepancy, or a number of samples that must remain below a threshold value in a given time interval may adjust.

Figure 7:
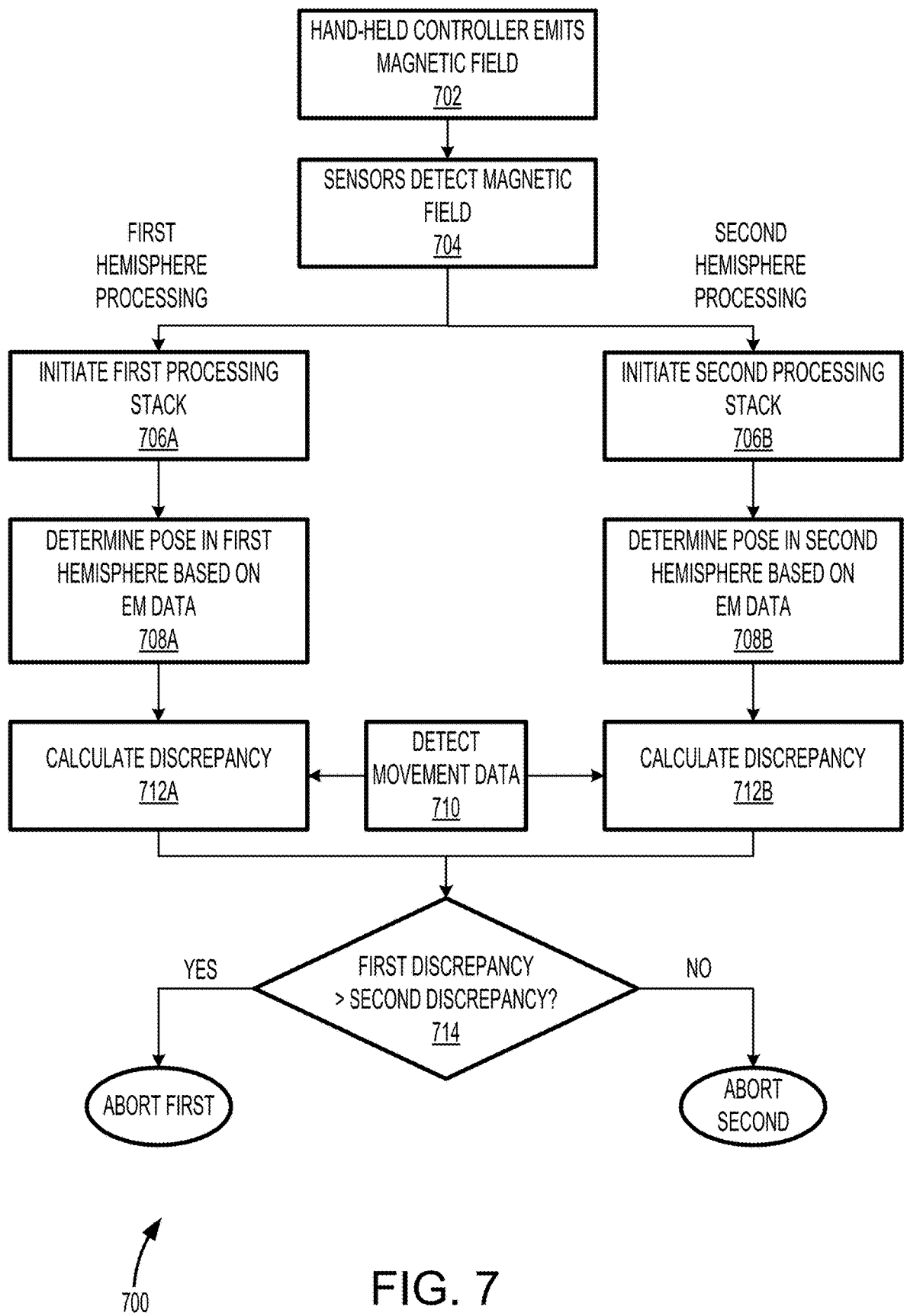
FIG. 7 illustrates a method for resolving hemisphere ambiguity at a system or device including one or more sensors.

FIG. 7 illustrates a method 700 for resolving hemisphere ambiguity at a system or device including one or more sensors. The system may be an electromagnetic tracking system or an optical device, such as an AR device, or any system supporting the emission and reception of magnetic signals, among other possibilities. One or more steps of method 700 may be omitted during performance of method 700, and steps need not be performed in the order shown. One or more steps of method 700 may be performed by controller 306, local processing and data module 270, and/or remote processing module 272, among other possibilities. One or more steps of method 700 may correspond to one or more steps of method 600.

At step 702, one or more magnetic fields may be emitted by a magnetic field emitter positioned at the handheld controller. At step 704, the one or more magnetic fields may be detected by one or more sensors positioned within the headset or the belt pack. At step 706A, a first processing stack is initiated causing the first processing stack to run during a first time interval. At step 706B, a second processing stack is initiated causing the second processing stack to run during a second time interval. At step 708A, the position and orientation of the handheld controller within a first hemisphere is determined based on the detected magnetic fields. At step 708B, the position and orientation of the handheld controller within a second hemisphere is determined based on the detected magnetic fields. The first hemisphere and the second hemisphere may be diametrically opposite and, in some embodiments, may correspond to the front hemisphere and the back hemisphere with respect to the headset.

At step 710, movement data is detected by a movement sensor, similar to that described in reference to step 610. At steps 712A, 712B, one or more performance statistics of the first processing stack and the second processing stack are analyzed, respectively. In the illustrated embodiment, a discrepancy is calculated between the determined positions and orientations from steps 708A, 708B and a relative movement of the handheld controller with respect to the headset as determined using the movement data.

At step 714 the discrepancies calculated in steps 712A, 712B are compared to each other. If the discrepancy calculated in step 712A (i.e., the "first discrepancy") exceeds the discrepancy calculated in step 712B (i.e., the "second discrepancy"), then the first processing stack is aborted and the second processing stack is allowed to continue processing (e.g., continue determinations of the pose of the handheld controller in the respective hemisphere based on additional detected magnetic fields). On the other hand, if the first discrepancy is less than the second discrepancy, then the second processing stack is aborted and the first processing stack is allowed to continue processing.

In some embodiments described herein, the term "EM tracking" may refer to the usage of EM waves to determine the location of an object. In some embodiments described herein, the term "pose" may refer to the (x, y, z) definition of an objects position in relation to the world pose. In some embodiments described herein, the term "world pose" may refer to the position of an object in relation to the (0, 0, 0) reference point. In some embodiments described herein, the term "head pose" may refer to the position of the head in the world. In some embodiments described herein, the term "totem pose" may refer to the position of the totem/handheld controller in the world. In some embodiments, the totem pose is computed by adding the fused pose to the head pose. In some embodiments described herein, the term "IMU pose" corresponds to the movement of the totem as measured by the IMU. In some embodiments described herein, the term "EM pose" corresponds to the movement of the totem as measured by the EM tracking. In some embodiments described herein, the term "fused pose" is calculated by factoring in the IMU pose into the EM pose along with some additional filtering. In some embodiments, simultaneous poses are run through the tracking algorithm to obtain two versions of all totem poses: EM, IMU, and fused. Based on the employed method, the appropriate pose velocity (change in position) is compared with the expected change, which is assumed depending on the conditions observed.

In some implementations, the totem pose hemisphere is established when no totem motion is detected concurrently with a changing head pose. This approach relies on there being no totem motion detected by the totem IMU and also the head pose changing at the same time instant. The premise is that if the totem pose were to be initialized in the wrong hemisphere, then a change in the head pose would result in a change in the totem pose, all in the world frame or its converse, that is, a totem pose initialized in the right hemisphere should see no change in its pose even if the head pose changes.

In some embodiments, the totem pose is calculated by combining the EM sensor measured distance between the EM emitter and receiver, and adding it to the head pose after putting the data through the necessary transformations so that the reference frames are aligned. If the totem has not moved, and the head moves away from the totem, the EM distance should change by the same absolute value to ensure that the calculated totem pose remains the same. In some embodiments, this method provides an algebraic solution where an inequality in the calculated totem pose is an indicator of incorrect hemisphere initialization. Multiple samples can be collected with the totem at rest and if all samples result in a moving totem pose in the world frame, when the head is moving, then the chosen hemisphere can be discarded as the incorrect one.

Figure 8:
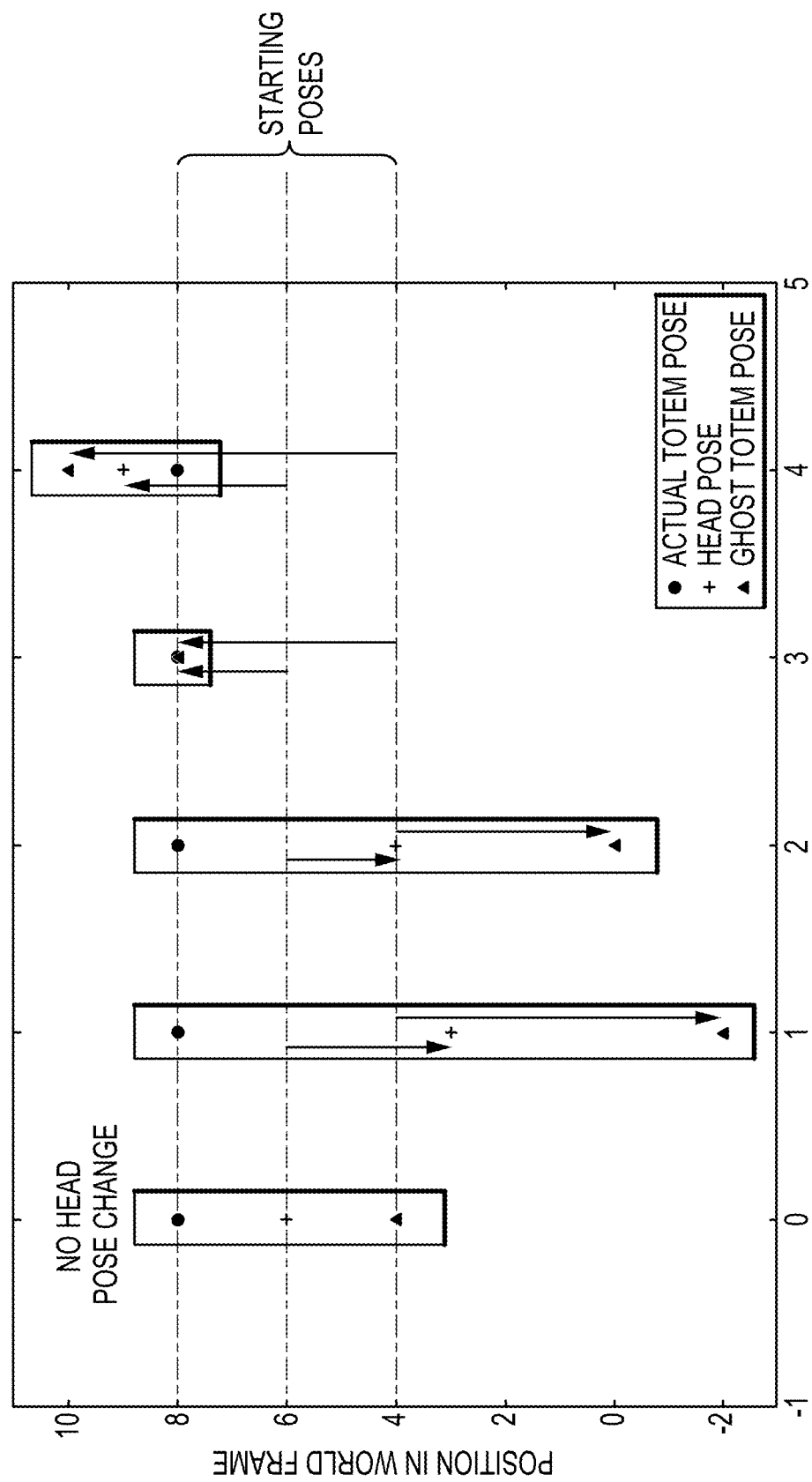
FIG. 8 illustrates results of a simulation showing the expected totem pose when the head is moving and the totem is still.

FIG. 8 illustrates results of a simulation showing the expected totem pose when the head is moving and the totem is still. The simulated data is backed up by the experimental data shown in reference to FIGS. 9-12 and validates embodiments of the present disclosure that are able to determine that with the head moving and the totem still, the actual totem pose will not change in the world reference frame. The fused totem pose is shown in this example since the EM totem pose tends to have significant noise and the fused pose includes processing to account for the movement data and the necessary filtering.

Referring to FIG. 8, the totem pose is unchanged in examples 0 through 4, illustrated as position 8 in the world frame. In example 0, the head pose is static at position 6 in the world frame and a ghost totem pose is present at position 4 in the world frame. Referring to example 1, the head pose shifts from position 6 to approximately position 3 in the world frame. In response to this change in head pose, although the actual totem position is static at position 8, the ghost totem pose shifts from position 4 to position −2 in the world frame. Referring to example 2, the head pose shifts from position 6 to approximately position 4 and again the actual totem position is static while the ghost totem pose shifts from position 4 to approximately position 0. Referring to example 3, the head pose shifts from position 6 to position 8 and the ghost totem pose also moves to position 8. Referring to example 4, the head pose shifts from position 6 to approximately position 9 while the ghost totem pose shifts from position 4 to approximately position 10. As can be observed in examples 0 through 4, in some embodiments, the relative distance between the head pose and each of the totem poses (actual and ghost) in the world frame may be identical over a wide range of positions of the head pose.

Figure 9:
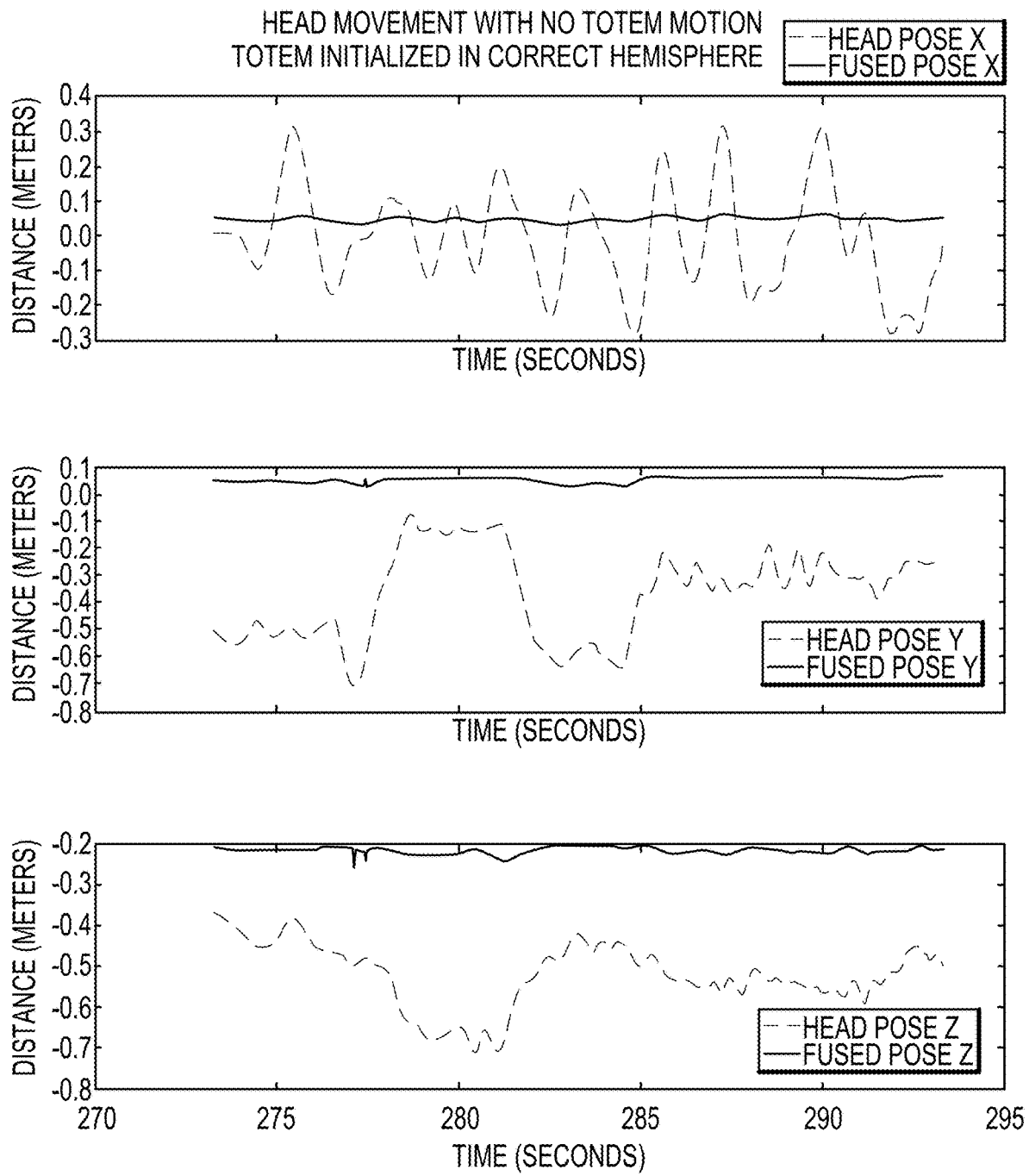
FIG. 9 illustrates experimental data when the head is moving and the totem is still, with the totem being initialized in the correct hemisphere.

FIG. 9 illustrates experimental data when the head is moving and the totem is still, with the totem being initialized in the correct hemisphere. As shown in FIG. 9, the totem fused pose remains mostly unchanged in spite of head motion when the totem is initialized in the correct hemisphere, as was theorized by the actual totem pose as demonstrated by the simulated data in FIG. 8, which showed no movement of the actual totem pose across examples 0 through 4.

Figure 10:
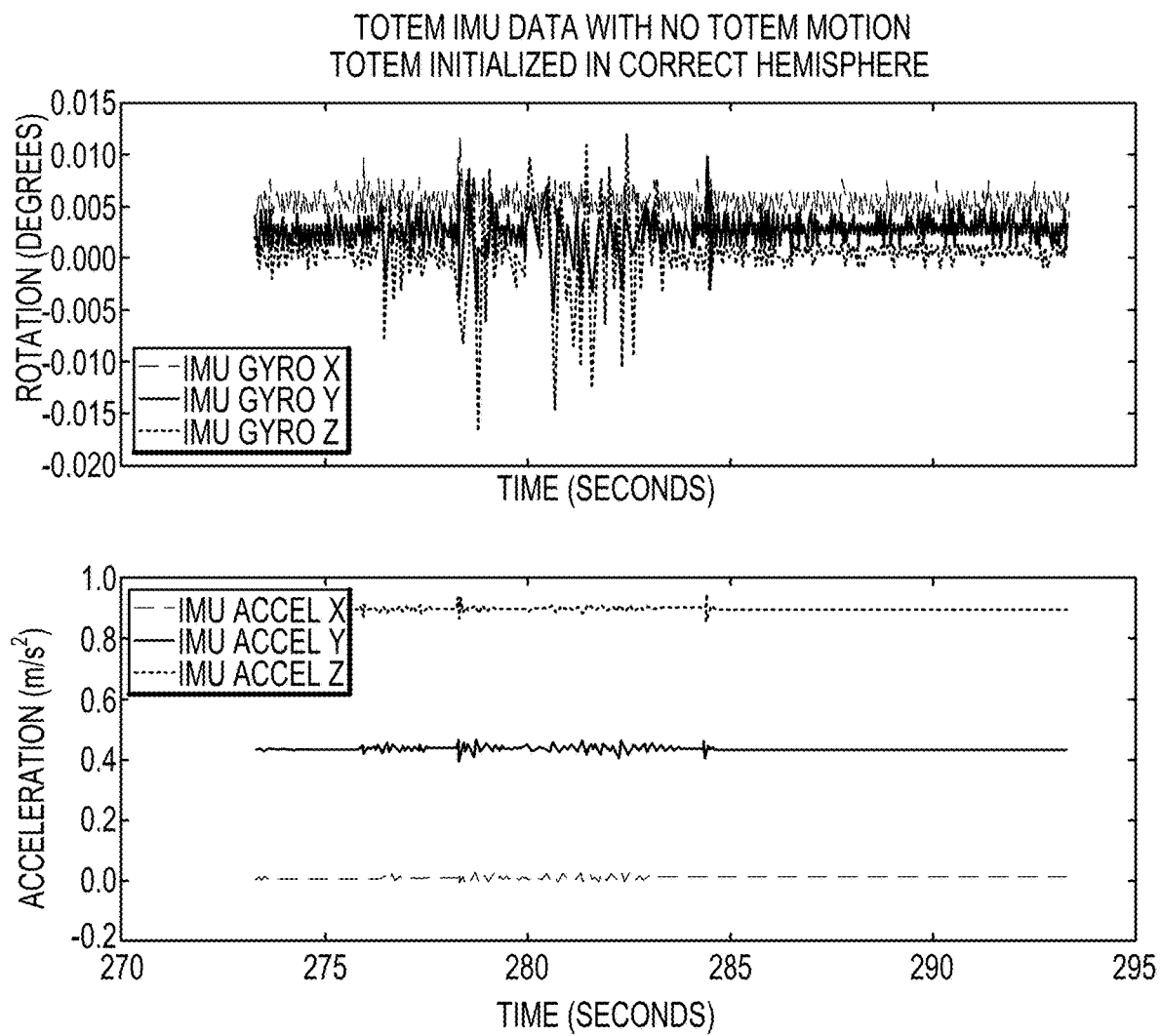
FIG. 10 illustrates experimental totem movement data when the totem is still, with the totem being initialized in the correct hemisphere.

FIG. 10 illustrates experimental totem movement data when the totem is still, with the totem being initialized in the correct hemisphere. The data shown in FIG. 10 may correspond to the pose data shown in FIG. 9. The upper plot of FIG. 10 shows rotation (in degrees) measurements by the IMU gyros as a function of time and the lower plot of FIG. 10 shows acceleration (in m/s$^2$) measurements by the IMU accelerometers as a function of time. As shown in FIG. 10, the IMU gyro data has some noise around the zero degrees rotation value. The IMU acceleration data shows that no translational change is seen on the X, Y, and Z axes. Since the change in acceleration is measured with respect to the gravitational acceleration, the constant offset on the Y and Z axes, even with no totem motion, is expected.

Figure 11:
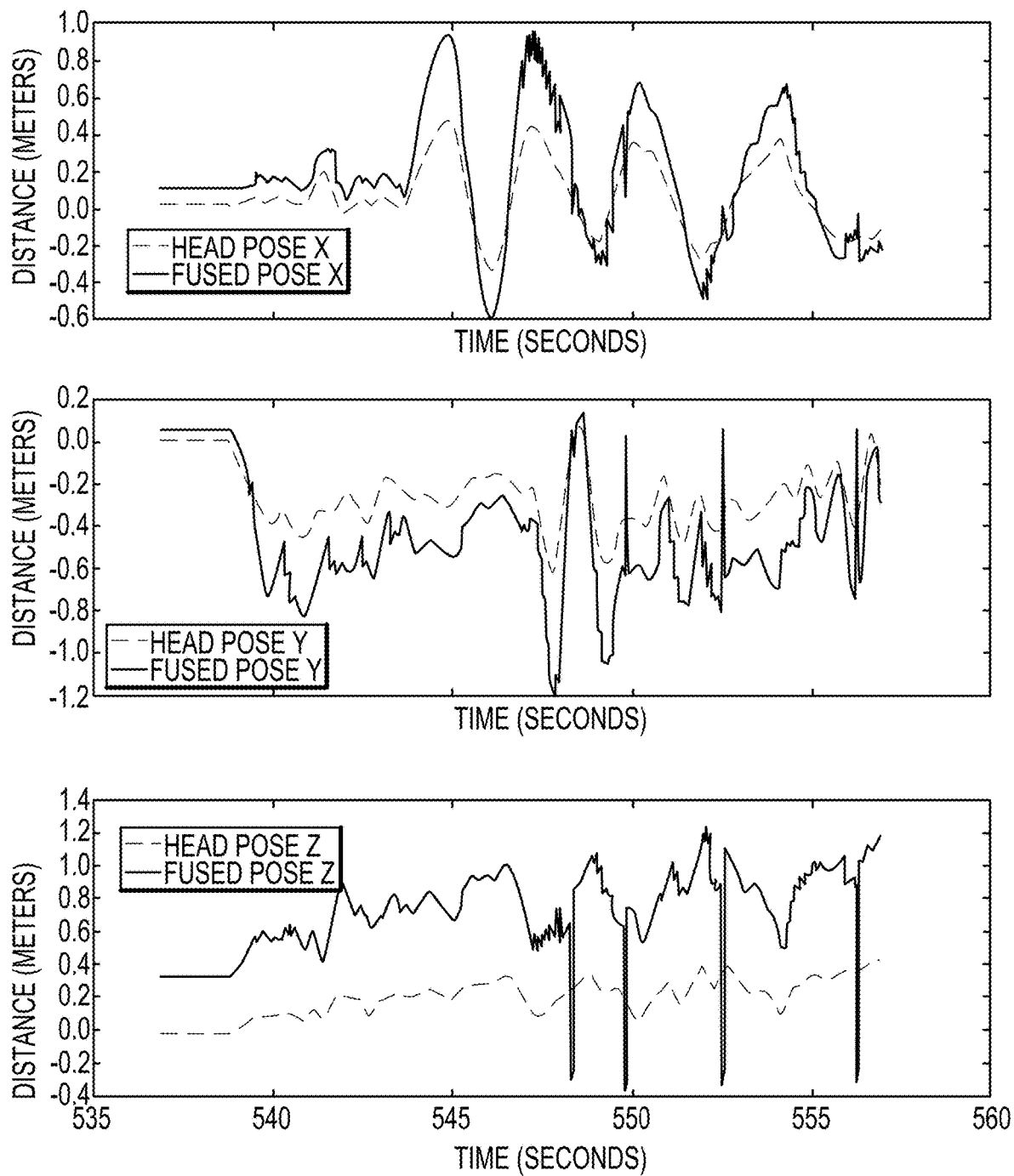
FIG. 11 illustrates experimental data when the head is moving and the totem is still, with the totem being initialized in the wrong hemisphere.

FIG. 11 illustrates experimental data when the head is moving and the totem is still, with the totem being initialized in the wrong hemisphere. The experimental data shows that the totem pose is changing with head movement even when the totem is still. It is apparent that the totem fused pose is a magnified version of the head pose when initialized in the wrong hemisphere, as was theorized by the "ghost totem pose" simulated data in FIG. 8, which showed significant movement of the ghost totem pose across examples 0 through 4.

Figure 12:
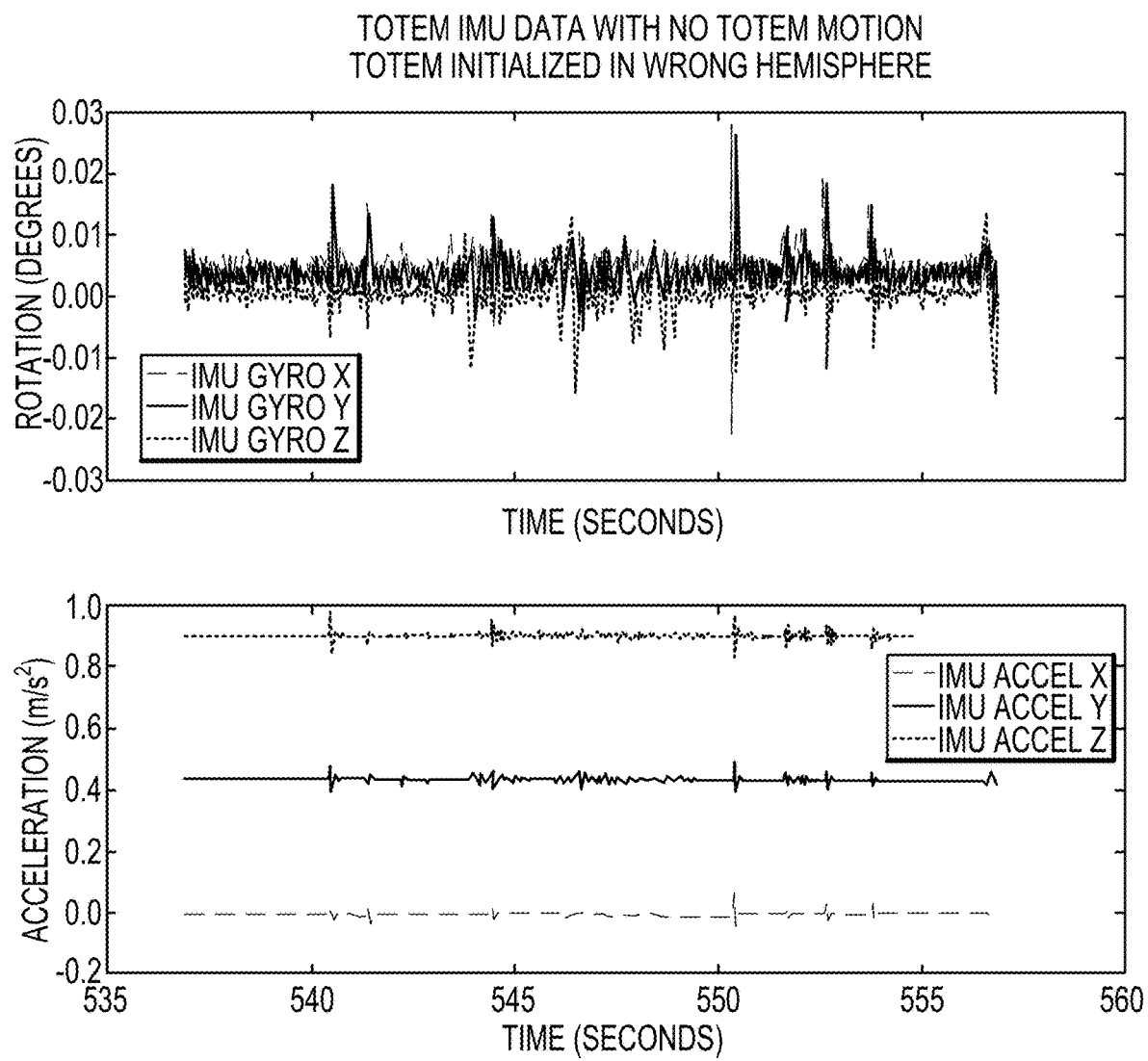
FIG. 12 illustrates experimental totem movement data with no totem motion corresponding to the pose data displayed in FIG. 11.

FIG. 12 illustrates experimental totem movement data with no totem motion corresponding to the pose data displayed in FIG. 11. The upper plot of FIG. 12 shows rotation (in degrees) measurements by the IMU gyros as a function of time and the lower plot of FIG. 12 shows acceleration (in m/s$^2$) measurements by the IMU accelerometers as a function of time. The IMU gyro data shows little noise around the zero degrees rotation value and the IMU acceleration data shows that no translational change is seen on the X, Y, and Z axes.

Figure 13:
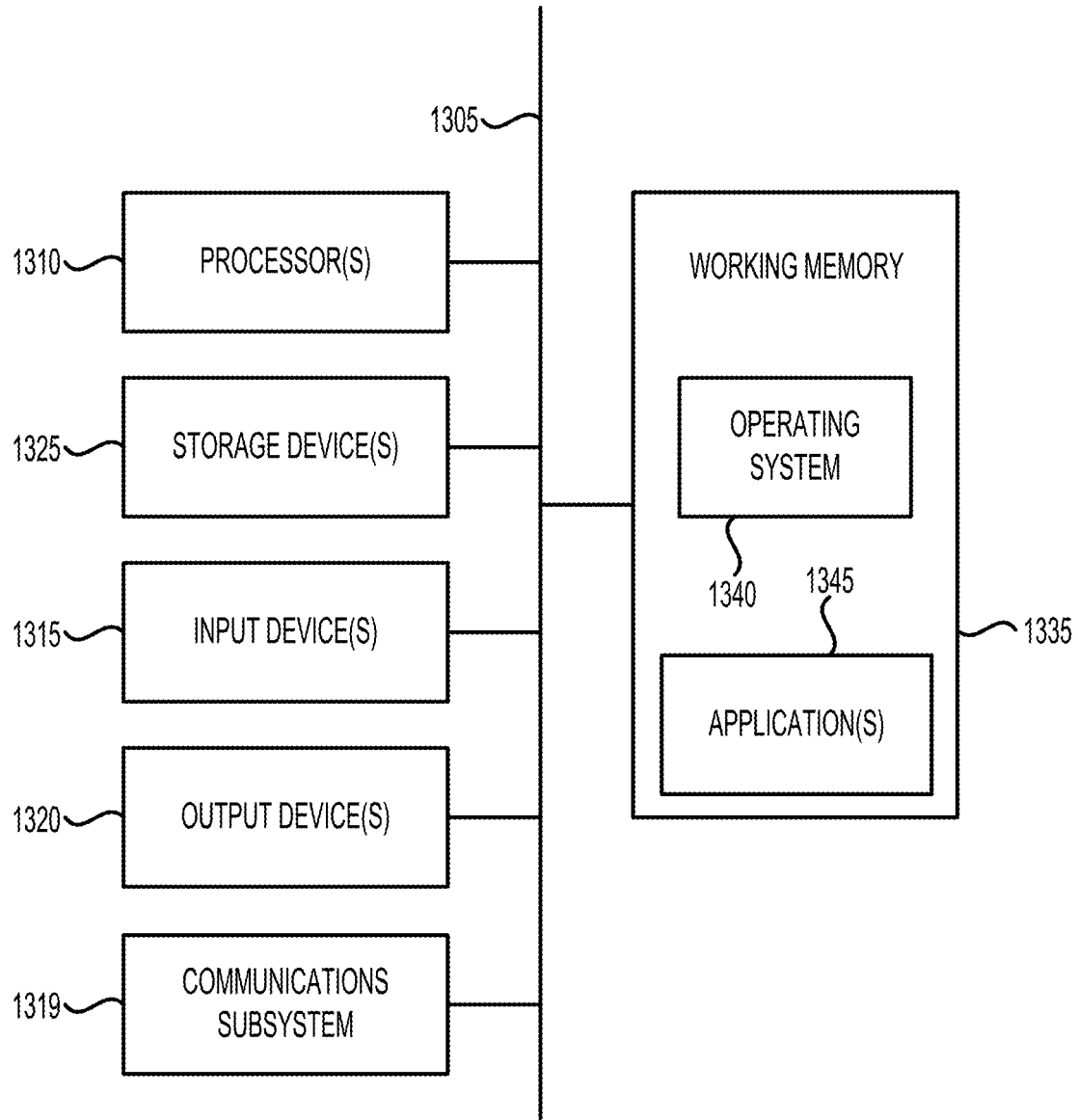
FIG. 13 illustrates a computer system, according to some embodiments described herein.

FIG. 13 illustrates a simplified computer system 1300 according to an embodiment described herein. Computer system 1300 as illustrated in FIG. 13 may be incorporated into devices described herein. FIG. 13 provides a schematic illustration of one embodiment of computer system 1300 that can perform some or all of the steps of the methods provided by various embodiments. It should be noted that FIG. 13 is meant only to provide a generalized illustration of various components, any or all of which may be utilized as appropriate. FIG. 13, therefore, broadly illustrates how individual system elements may be implemented in a relatively separated or relatively more integrated manner.

Computer system 1300 is shown including hardware elements that can be electrically coupled via a bus 1305, or may otherwise be in communication, as appropriate. The hardware elements may include one or more processors 1310, including without limitation one or more general-purpose processors and/or one or more special-purpose processors such as digital signal processing chips, graphics acceleration processors, and/or the like; one or more input devices 1315, which can include without limitation a mouse, a keyboard, a camera, and/or the like; and one or more output devices 1320, which can include without limitation a display device, a printer, and/or the like.

Computer system 1300 may further include and/or be in communication with one or more non-transitory storage devices 1325, which can include, without limitation, local and/or network accessible storage, and/or can include, without limitation, a disk drive, a drive array, an optical storage device, a solid-state storage device, such as a random access memory ("RAM"), and/or a read-only memory ("ROM"), which can be programmable, flash-updateable, and/or the like. Such storage devices may be configured to implement any appropriate data stores, including without limitation, various file systems, database structures, and/or the like.

Computer system 1300 might also include a communications subsystem 1319, which can include without limitation a modem, a network card (wireless or wired), an infrared communication device, a wireless communication device, and/or a chipset such as a Bluetooth™ device, an 802.11 device, a WiFi device, a WiMax device, cellular communication facilities, etc., and/or the like. The communications subsystem 1319 may include one or more input and/or output communication interfaces to permit data to be exchanged with a network such as the network described below to name one example, other computer systems, television, and/or any other devices described herein. Depending on the desired functionality and/or other implementation concerns, a portable electronic device or similar device may communicate image and/or other information via the communications subsystem 1319. In other embodiments, a portable electronic device, e.g., the first electronic device, may be incorporated into computer system 1300, e.g., an electronic device as an input device 1315. In some embodiments, computer system 1300 will further include a working memory 1335, which can include a RAM or ROM device, as described above.

Computer system 1300 also can include software elements, shown as being currently located within the working memory 1335, including an operating system 1340, device drivers, executable libraries, and/or other code, such as one or more application programs 1345, which may include computer programs provided by various embodiments, and/or may be designed to implement methods, and/or configure systems, provided by other embodiments, as described herein. Merely by way of example, one or more procedures described with respect to the methods discussed above, might be implemented as code and/or instructions executable by a computer and/or a processor within a computer; in an aspect, then, such code and/or instructions can be used to configure and/or adapt a general purpose computer or other device to perform one or more operations in accordance with the described methods.

A set of these instructions and/or code may be stored on a non-transitory computer-readable storage medium, such as the storage device(s) 1325 described above. In some cases, the storage medium might be incorporated within a computer system, such as computer system 1300. In other embodiments, the storage medium might be separate from a computer system e.g., a removable medium, such as a compact disc, and/or provided in an installation package, such that the storage medium can be used to program, configure, and/or adapt a general purpose computer with the instructions/code stored thereon. These instructions might take the form of executable code, which is executable by computer system 1300 and/or might take the form of source and/or installable code, which, upon compilation and/or installation on computer system 1300 e.g., using any of a variety of generally available compilers, installation programs, compression/decompression utilities, etc., then takes the form of executable code.

It will be apparent to those skilled in the art that substantial variations may be made in accordance with specific requirements. For example, customized hardware might also be used, and/or particular elements might be implemented in hardware, software including portable software, such as applets, etc., or both. Further, connection to other computing devices such as network input/output devices may be employed.

As mentioned above, in one aspect, some embodiments may employ a computer system such as computer system 1300 to perform methods in accordance with various embodiments of the technology. According to a set of embodiments, some or all of the procedures of such methods are performed by computer system 1300 in response to processor 1310 executing one or more sequences of one or more instructions, which might be incorporated into the operating system 1340 and/or other code, such as an application program 1345, contained in the working memory 1335. Such instructions may be read into the working memory 1335 from another computer-readable medium, such as one or more of the storage device(s) 1325. Merely by way of example, execution of the sequences of instructions contained in the working memory 1335 might cause the processor(s) 1310 to perform one or more procedures of the methods described herein. Additionally or alternatively, portions of the methods described herein may be executed through specialized hardware.

The terms "machine-readable medium" and "computer-readable medium," as used herein, refer to any medium that participates in providing data that causes a machine to operate in a specific fashion. In an embodiment implemented using computer system 1300, various computer-readable media might be involved in providing instructions/code to processor(s) 1310 for execution and/or might be used to store and/or carry such instructions/code. In many implementations, a computer-readable medium is a physical and/or tangible storage medium. Such a medium may take the form of a non-volatile media or volatile media. Non-volatile media include, for example, optical and/or magnetic disks, such as the storage device(s) 1325. Volatile media include, without limitation, dynamic memory, such as the working memory 1335.

Common forms of physical and/or tangible computer-readable media include, for example, a floppy disk, a flexible disk, hard disk, magnetic tape, or any other magnetic medium, a CD-ROM, any other optical medium, punchcards, papertape, any other physical medium with patterns of holes, a RAM, a PROM, EPROM, a FLASH-EPROM, any other memory chip or cartridge, or any other medium from which a computer can read instructions and/or code.

Various forms of computer-readable media may be involved in carrying one or more sequences of one or more instructions to the processor(s) 1310 for execution. Merely by way of example, the instructions may initially be carried on a magnetic disk and/or optical disc of a remote computer. A remote computer might load the instructions into its dynamic memory and send the instructions as signals over a transmission medium to be received and/or executed by computer system 1300.

The communications subsystem 1319 and/or components thereof generally will receive signals, and the bus 1305 then might carry the signals and/or the data, instructions, etc. carried by the signals to the working memory 1335, from which the processor(s) 1310 retrieves and executes the instructions. The instructions received by the working memory 1335 may optionally be stored on a non-transitory storage device 1325 either before or after execution by the processor(s) 1310.

The methods, systems, and devices discussed above are examples. Various configurations may omit, substitute, or add various procedures or components as appropriate. For instance, in alternative configurations, the methods may be performed in an order different from that described, and/or various stages may be added, omitted, and/or combined. Also, features described with respect to certain configurations may be combined in various other configurations. Different aspects and elements of the configurations may be combined in a similar manner. Also, technology evolves and, thus, many of the elements are examples and do not limit the scope of the disclosure or claims.

Specific details are given in the description to provide a thorough understanding of exemplary configurations including implementations. However, configurations may be practiced without these specific details. For example, well-known circuits, processes, algorithms, structures, and techniques have been shown without unnecessary detail in order to avoid obscuring the configurations. This description provides example configurations only, and does not limit the scope, applicability, or configurations of the claims. Rather, the preceding description of the configurations will provide those skilled in the art with an enabling description for implementing described techniques. Various changes may be made in the function and arrangement of elements without departing from the spirit or scope of the disclosure.

Also, configurations may be described as a process which is depicted as a schematic flowchart or block diagram. Although each may describe the operations as a sequential process, many of the operations can be performed in parallel or concurrently. In addition, the order of the operations may be rearranged. A process may have additional steps not included in the figure.

Furthermore, examples of the methods may be implemented by hardware, software, firmware, middleware, microcode, hardware description languages, or any combination thereof. When implemented in software, firmware, middleware, or microcode, the program code or code segments to perform the necessary tasks may be stored in a non-transitory computer-readable medium such as a storage medium. Processors may perform the described tasks.

Having described several example configurations, various modifications, alternative constructions, and equivalents may be used without departing from the spirit of the disclosure. For example, the above elements may be components of a larger system, wherein other rules may take precedence over or otherwise modify the application of the technology. Also, a number of steps may be undertaken before, during, or after the above elements are considered. Accordingly, the above description does not bind the scope of the claims.

As used herein and in the appended claims, the singular forms "a", "an", and "the" include plural references unless the context clearly dictates otherwise. Thus, for example, reference to "a user" includes one or more of such users, and reference to "the processor" includes reference to one or more processors and equivalents thereof known to those skilled in the art, and so forth.

Also, the words "comprise", "comprising", "contains", "containing", "include", "including", and "includes", when used in this specification and in the following claims, are intended to specify the presence of stated features, integers, components, or steps, but they do not preclude the presence or addition of one or more other features, integers, components, steps, acts, or groups.

It is also understood that the examples and embodiments described herein are for illustrative purposes only and that various modifications or changes in light thereof will be suggested to persons skilled in the art and are to be included within the spirit and purview of this application and scope of the appended claims.

What is claimed is:

1. A method comprising:
   emitting magnetic fields at a handheld controller;
   detecting the magnetic fields at a magnetic field sensor positioned relative to a headset;
   initiating a first processing stack and a second processing stack;
   wherein the first processing stack includes, at each of multiple first time steps:
      determining a first position and a first orientation of the handheld controller within a first hemisphere with respect to the headset based on the magnetic fields detected by the magnetic field sensor; and
      calculating a first discrepancy based on the first position and the first orientation;
   wherein the second processing stack includes, at each of multiple second time steps:
      determining a second position and a second orientation of the handheld controller within a second hemisphere with respect to the headset based on the magnetic fields detected by the magnetic field sensor, wherein the second hemisphere is diametrically opposite the first hemisphere; and
      calculating a second discrepancy based on the second position and the second orientation; and
   after the multiple first time steps and the multiple second time steps, making a determination, based on the first discrepancy and the second discrepancy, as whether to (i) abort the first processing stack, (ii) abort the second processing stack, or (iii) continue processing with both the first processing stack and the second processing stack, wherein it is determined to abort the first processing stack if the first discrepancy is greater than a threshold, it is determined to abort the second processing stack if the second discrepancy is greater than the threshold, and it is determined to continue processing with both the first processing stack and the second processing stack if the first discrepancy and the second discrepancy are less than the threshold.

2. The method of claim 1, further comprising:
   detecting movement data corresponding to movement of the handheld controller or the headset, wherein the first discrepancy and the second discrepancy are calculated further based on the movement data.

3. The method of claim 1, further comprising:
   if the determination is to abort the first processing stack, continuing to determine positions and orientations of the handheld controller within the second hemisphere; and
   if the determination is to abort the second processing stack, continuing to determine positions and orientations of the handheld controller within the first hemisphere.

4. The method of claim 2, wherein the movement data corresponds to the movement of the handheld controller, and wherein the movement data is detected by a movement sensor positioned within the handheld controller.

5. The method of claim 2, wherein the movement data corresponds to the movement of the headset, and wherein the movement data is detected by a movement sensor positioned within the headset.

6. The method of claim 1, wherein the first hemisphere is a front hemisphere with respect to the headset and the second hemisphere is a back hemisphere with respect to the headset.

7. A system comprising:
   a handheld controller comprising a magnetic field emitter configured to emit magnetic fields;
   a headset comprising a magnetic field sensor configured to detect the magnetic fields; and
   one or more processors configured to perform operations including:
      initiating a first processing stack and a second processing stack;
      wherein the first processing stack includes, at each of multiple first time steps:
         determining a first position and a first orientation of the handheld controller within a first hemisphere with respect to the headset based on the magnetic fields detected by the magnetic field sensor; and
         calculating a first discrepancy based on the first position and the first orientation;
      wherein the second processing stack includes, at each of multiple second time steps:
         determining a second position and a second orientation of the handheld controller within a second hemisphere with respect to the headset based on the magnetic fields detected by the magnetic field sensor, wherein the second hemisphere is diametrically opposite the first hemisphere; and
         calculating a second discrepancy based on the second position and the second orientation; and
      after the multiple first time steps and the multiple second time steps, making a determination, based on the first discrepancy and the second discrepancy, as whether to (i) abort the first processing stack, (ii) abort the second processing stack, or (iii) continue processing with both the first processing stack and the second processing stack, wherein it is determined to abort the first processing stack if the first discrepancy is greater than a threshold, it is determined to abort the second processing stack if the second discrepancy is greater than the threshold, and it is determined to continue processing with both the first processing stack and the second processing stack if the first discrepancy and the second discrepancy are less than the threshold.

8. The system of claim 7, further comprising:
   a movement sensor configured to detect movement data corresponding to movement of the handheld controller or the headset, wherein the first discrepancy and the second discrepancy are calculated further based on the movement data.

9. The system of claim 7, wherein the operations further comprise:

if the determination is to abort the first processing stack, continuing to determine positions and orientations of the handheld controller within the second hemisphere; and if the determination is to abort the second processing stack, continuing to determine positions and orientations of the handheld controller within the first hemisphere.

10. The system of claim 8, wherein the movement data corresponds to the movement of the handheld controller, and wherein the movement sensor is positioned within the handheld controller.

11. The system of claim 8, wherein the movement data corresponds to the movement of the headset, and wherein the movement sensor is positioned within the headset.

12. The system of claim 7, wherein the first hemisphere is a front hemisphere with respect to the headset and the second hemisphere is a back hemisphere with respect to the headset.

13. A non-transitory computer-readable medium comprising instructions that, when executed by one or more processors, cause the one or more processors to perform operations comprising:

causing magnetic fields to be emitted at a handheld controller;

causing the magnetic fields to be detected at a magnetic field sensor positioned relative to a headset;

initiating a first processing stack and a second processing stack;

wherein the first processing stack includes, at each of multiple first time steps:

determining a first position and a first orientation of the handheld controller within a first hemisphere with respect to the headset based on the magnetic fields detected by the magnetic field sensor; and calculating a first discrepancy based on the first position and the first orientation;

wherein the second processing stack includes, at each of multiple second time steps:

determining a second position and a second orientation of the handheld controller within a second hemisphere with respect to the headset based on the magnetic fields detected by the magnetic field sensor, wherein the second hemisphere is diametrically opposite the first hemisphere; and calculating a second discrepancy based on the second position and the second orientation; and after the multiple first time steps and the multiple second time steps, making a determination as whether to (i) abort the first processing stack, (ii) abort the second processing stack, or (iii) continue processing with both the first processing stack and the second processing stack, wherein it is determined to abort the first processing stack if the first discrepancy is greater than a threshold, it is determined to abort the second processing stack if the second discrepancy is greater than the threshold, and it is determined to continue processing with both the first processing stack and the second processing stack if the first discrepancy and the second discrepancy are less than the threshold.

14. The non-transitory computer-readable medium of claim 13, wherein the operations further comprise:

detecting movement data corresponding to movement of the handheld controller or the headset, wherein the first discrepancy and the second discrepancy are calculated further based on the movement data.

15. The non-transitory computer-readable medium of claim 13, wherein the operations further comprise:

if the determination is to abort the first processing stack, continuing to determine positions and orientations of the handheld controller within the second hemisphere; and if the determination is to abort the second processing stack, continuing to determine positions and orientations of the handheld controller within the first hemisphere.

16. The non-transitory computer-readable medium of claim 14, wherein the movement data corresponds to the movement of the handheld controller, and wherein the movement data is detected by a movement sensor positioned within the handheld controller.

17. The non-transitory computer-readable medium of claim 14, wherein the movement data corresponds to the movement of the headset, and wherein the movement data is detected by a movement sensor positioned within the headset.

* * * * *